US011258761B2

(12) United States Patent
Bansal et al.

(10) Patent No.: US 11,258,761 B2
(45) Date of Patent: *Feb. 22, 2022

(54) SELF-SERVICE FIREWALL CONFIGURATION

(71) Applicant: Nicira, Inc., Palo Alto, CA (US)

(72) Inventors: Kaushal Bansal, Sunnyvale, CA (US); Uday Masurekar, Sunnyvale, CA (US)

(73) Assignee: NICIRA, INC., Palo Alto, CA (US)

( * ) Notice: Subject to any disclaimer, the term of this patent is extended or adjusted under 35 U.S.C. 154(b) by 505 days.

This patent is subject to a terminal disclaimer.

(21) Appl. No.: 15/196,448

(22) Filed: Jun. 29, 2016

(65) Prior Publication Data

US 2018/0007007 A1 Jan. 4, 2018

(51) Int. Cl.
*H04L 29/06* (2006.01)

(52) U.S. Cl.
CPC .......... *H04L 63/0263* (2013.01); *H04L 63/10* (2013.01)

(58) Field of Classification Search
CPC ... H04L 63/0428; H04L 63/164; H04L 63/08; H04L 63/029; H04L 63/166
USPC .......................................................... 726/14
See application file for complete search history.

(56) References Cited

U.S. PATENT DOCUMENTS

| 5,581,722 | A | 12/1996 | Welland |
| 5,968,176 | A | 10/1999 | Nessett et al. |
| 6,154,775 | A | 11/2000 | Coss et al. |
| 6,219,786 | B1 | 4/2001 | Cunningham et al. |
| 6,496,935 | B1 | 12/2002 | Fink et al. |
| 6,600,744 | B1 | 7/2003 | Carr et al. |
| 6,708,187 | B1 | 3/2004 | Shanumgam et al. |
| 6,880,089 | B1 | 4/2005 | Bommareddy et al. |
| 7,032,022 | B1 | 4/2006 | Shanumgam et al. |
| 7,055,173 | B1 | 5/2006 | Chaganty et al. |
| 7,106,756 | B1 | 9/2006 | Donovan et al. |
| 7,227,842 | B1 | 6/2007 | Ji et al. |
| 7,349,382 | B2 | 3/2008 | Marimuthu et al. |
| 7,657,887 | B2 | 2/2010 | Kothandaraman et al. |
| 7,676,836 | B2 | 3/2010 | Prigent et al. |
| 7,724,740 | B1 | 5/2010 | Wang et al. |
| 7,818,452 | B2 | 10/2010 | Matthews et al. |

(Continued)

FOREIGN PATENT DOCUMENTS

| EP | 2748750 A1 | 7/2014 |
| JP | 2003188906 A | 7/2003 |

(Continued)

OTHER PUBLICATIONS

Author Unknown, "AppLogic Features," Jul. 2007, 2 pages. 3TERA, Inc.

(Continued)

*Primary Examiner* — Evans Desrosiers

(74) *Attorney, Agent, or Firm* — Adeli LLP

(57) ABSTRACT

A novel method for managing firewall configuration of a software defined data center is provided. Such a firewall configuration is divided into multiple sections that each contains a set of firewall rules. Each tenant of the software defined data center has a corresponding set of sections in the firewall configuration. The method allows each tenant to independently access and update/manage its own corresponding set of sections. Multiple tenants or users are allowed to make changes to the firewall configuration simultaneously.

21 Claims, 27 Drawing Sheets

(56) References Cited

U.S. PATENT DOCUMENTS

| | | |
|---|---|---|
| 7,831,826 B2 | 11/2010 | Koti et al. |
| 7,894,480 B1 | 2/2011 | Wang et al. |
| 7,948,986 B1 | 5/2011 | Ghosh et al. |
| 7,954,143 B2 | 5/2011 | Aaron |
| 8,032,933 B2 | 10/2011 | Turley et al. |
| 8,065,725 B2 | 11/2011 | Zheng et al. |
| 8,190,767 B1 | 5/2012 | Maufer et al. |
| 8,365,294 B2 | 1/2013 | Ross |
| 8,578,500 B2 | 11/2013 | Long |
| 8,621,552 B1 | 12/2013 | Lotem et al. |
| 8,660,129 B1 | 2/2014 | Brendel et al. |
| 8,813,209 B2 | 8/2014 | Bhattacharya et al. |
| 8,904,511 B1 | 12/2014 | O'Neill et al. |
| 9,015,823 B2 | 4/2015 | Koponen et al. |
| 9,047,109 B1 | 6/2015 | Wang et al. |
| 9,130,901 B2 | 9/2015 | Lee |
| 9,154,462 B2 | 10/2015 | Grimes et al. |
| 9,215,210 B2 | 12/2015 | Raman et al. |
| 9,215,213 B2 | 12/2015 | Bansal et al. |
| 9,215,214 B2 | 12/2015 | Bansal et al. |
| 9,276,904 B2 | 3/2016 | Bansal et al. |
| 9,367,257 B2 | 6/2016 | Hamilton et al. |
| 9,369,431 B1 | 6/2016 | Kirby et al. |
| 9,479,464 B1 | 10/2016 | Wang et al. |
| 9,553,806 B2 | 1/2017 | Anand |
| 9,614,748 B1 | 4/2017 | Battersby et al. |
| 9,680,706 B2 | 6/2017 | Masurekar et al. |
| 9,755,903 B2 | 9/2017 | Masurekar et al. |
| 9,774,537 B2 | 9/2017 | Jain et al. |
| 9,774,707 B2 | 9/2017 | Parthasarathy et al. |
| 9,806,948 B2 | 10/2017 | Masurekar et al. |
| 9,860,279 B2 | 1/2018 | Jain et al. |
| 9,894,103 B2 | 2/2018 | Kwok et al. |
| 9,906,560 B2 | 2/2018 | Jain et al. |
| 9,906,561 B2 | 2/2018 | Jain et al. |
| 9,906,562 B2 | 2/2018 | Jain et al. |
| 2002/0078370 A1 | 6/2002 | Tahan |
| 2003/0041266 A1 | 2/2003 | Ke et al. |
| 2003/0093481 A1 | 5/2003 | Mitchell et al. |
| 2003/0120955 A1 | 6/2003 | Bartal et al. |
| 2003/0126468 A1 | 7/2003 | Markham |
| 2003/0226027 A1 | 12/2003 | Marquet et al. |
| 2004/0049701 A1 | 3/2004 | Pennec et al. |
| 2004/0177276 A1 | 9/2004 | Mackinnon et al. |
| 2004/0223495 A1 | 11/2004 | Paehl |
| 2004/0243835 A1 | 12/2004 | Terzis et al. |
| 2005/0190909 A1 | 9/2005 | Yoneyama et al. |
| 2005/0198125 A1 | 9/2005 | Beck et al. |
| 2005/0210291 A1 | 9/2005 | Miyawaki et al. |
| 2005/0276262 A1 | 12/2005 | Schuba et al. |
| 2005/0278431 A1 | 12/2005 | Goldschmidt et al. |
| 2006/0013136 A1 | 1/2006 | Goldschmidt et al. |
| 2006/0129808 A1 | 6/2006 | Koti et al. |
| 2006/0168213 A1 | 7/2006 | Richardson et al. |
| 2006/0195896 A1 | 8/2006 | Fulp et al. |
| 2007/0028291 A1 | 2/2007 | Brennan et al. |
| 2007/0061492 A1 | 3/2007 | Riel |
| 2007/0118893 A1* | 5/2007 | Crawford ............ H04L 63/0281 726/11 |
| 2007/0136813 A1 | 6/2007 | Wong |
| 2008/0072305 A1 | 3/2008 | Casado et al. |
| 2008/0082977 A1 | 4/2008 | Araujo et al. |
| 2008/0115190 A1 | 5/2008 | Aaron |
| 2008/0148382 A1 | 6/2008 | Bartholomy et al. |
| 2008/0189769 A1 | 8/2008 | Casado et al. |
| 2008/0215518 A1 | 9/2008 | Matsuda |
| 2008/0267177 A1 | 10/2008 | Johnson et al. |
| 2008/0289028 A1 | 11/2008 | Jansen et al. |
| 2008/0298274 A1 | 12/2008 | Takashige et al. |
| 2009/0007219 A1 | 1/2009 | Abzarian et al. |
| 2009/0007251 A1 | 1/2009 | Abzarian et al. |
| 2009/0083727 A1 | 3/2009 | Fu et al. |
| 2009/0129271 A1 | 5/2009 | Ramankutty et al. |
| 2009/0150521 A1 | 6/2009 | Tripathi |
| 2009/0228972 A1 | 9/2009 | Bandi et al. |
| 2009/0235325 A1 | 9/2009 | Dimitrakos et al. |
| 2009/0249436 A1 | 10/2009 | Coles et al. |
| 2009/0249438 A1 | 10/2009 | Litvin et al. |
| 2009/0249470 A1 | 10/2009 | Litvin et al. |
| 2009/0249472 A1* | 10/2009 | Litvin ................ H04L 63/0263 726/14 |
| 2009/0276771 A1 | 11/2009 | Nickolov et al. |
| 2009/0327198 A1 | 12/2009 | Farah |
| 2009/0327781 A1 | 12/2009 | Tripathi |
| 2010/0037310 A1 | 2/2010 | Turley et al. |
| 2010/0037311 A1 | 2/2010 | He et al. |
| 2010/0037331 A1 | 2/2010 | Blake et al. |
| 2010/0043067 A1 | 2/2010 | Varadhan et al. |
| 2010/0100616 A1 | 4/2010 | Bryson et al. |
| 2010/0100949 A1 | 4/2010 | Sonwane et al. |
| 2010/0125667 A1 | 5/2010 | Soundararajan |
| 2010/0180331 A1 | 7/2010 | Murakami et al. |
| 2010/0192215 A1 | 7/2010 | Yaxuan et al. |
| 2011/0016467 A1 | 1/2011 | Kane |
| 2011/0022695 A1 | 1/2011 | Dalal et al. |
| 2011/0055916 A1* | 3/2011 | Ahn ...................... G06F 21/562 726/13 |
| 2011/0072486 A1 | 3/2011 | Hadar et al. |
| 2011/0103259 A1 | 5/2011 | Aybay et al. |
| 2011/0113467 A1 | 5/2011 | Agarwal et al. |
| 2011/0154470 A1 | 6/2011 | Grimes et al. |
| 2011/0213875 A1 | 9/2011 | Ferris et al. |
| 2011/0246637 A1 | 10/2011 | Murakami |
| 2011/0302647 A1 | 12/2011 | Bhattacharya et al. |
| 2012/0042033 A1 | 2/2012 | Ayala, Jr. et al. |
| 2012/0137199 A1 | 5/2012 | Liu |
| 2012/0180104 A1 | 7/2012 | Gronich et al. |
| 2012/0240182 A1 | 9/2012 | Narayanaswamy et al. |
| 2012/0263049 A1 | 10/2012 | Venkatachalapathy et al. |
| 2012/0291024 A1 | 11/2012 | Barabash et al. |
| 2012/0314617 A1 | 12/2012 | Erichsen et al. |
| 2013/0007740 A1 | 1/2013 | Kikuchi et al. |
| 2013/0019277 A1 | 1/2013 | Chang et al. |
| 2013/0031544 A1 | 1/2013 | Sridharan et al. |
| 2013/0047151 A1 | 2/2013 | Sridharan et al. |
| 2013/0073743 A1 | 3/2013 | Ramasamy et al. |
| 2013/0074066 A1 | 3/2013 | Sanzgiri et al. |
| 2013/0125230 A1 | 5/2013 | Koponen et al. |
| 2013/0163594 A1 | 6/2013 | Sharma et al. |
| 2013/0198355 A1 | 8/2013 | Kalyanaraman et al. |
| 2013/0219384 A1 | 8/2013 | Srinivasan et al. |
| 2013/0227097 A1 | 8/2013 | Yasuda et al. |
| 2013/0227550 A1 | 8/2013 | Weinstein et al. |
| 2013/0311358 A1 | 11/2013 | Sethi et al. |
| 2013/0311612 A1 | 11/2013 | Dickinson |
| 2013/0332983 A1 | 12/2013 | Koorevaar et al. |
| 2014/0068602 A1 | 3/2014 | Gember et al. |
| 2014/0108319 A1 | 4/2014 | Klauser et al. |
| 2014/0115578 A1 | 4/2014 | Cooper et al. |
| 2014/0149794 A1 | 5/2014 | Shetty et al. |
| 2014/0195666 A1 | 7/2014 | Dumitriu et al. |
| 2014/0245423 A1 | 8/2014 | Lee |
| 2014/0281030 A1 | 9/2014 | Cui et al. |
| 2014/0282855 A1 | 9/2014 | Clark et al. |
| 2014/0282889 A1 | 9/2014 | Ishaya et al. |
| 2014/0297780 A1 | 10/2014 | Zhou et al. |
| 2014/0304387 A1 | 10/2014 | Bansal et al. |
| 2014/0325037 A1 | 10/2014 | Elisha |
| 2015/0052521 A1 | 2/2015 | Raghu |
| 2015/0112933 A1 | 4/2015 | Satapathy |
| 2015/0193466 A1 | 7/2015 | Luft et al. |
| 2015/0200816 A1 | 7/2015 | Yung et al. |
| 2015/0229641 A1 | 8/2015 | Sun et al. |
| 2015/0237013 A1 | 8/2015 | Bansal et al. |
| 2015/0237014 A1 | 8/2015 | Bansal et al. |
| 2015/0237015 A1 | 8/2015 | Bansal et al. |
| 2015/0277949 A1 | 10/2015 | Loh et al. |
| 2016/0050117 A1 | 2/2016 | Voellmy et al. |
| 2016/0050141 A1 | 2/2016 | Wu et al. |
| 2016/0065627 A1 | 3/2016 | Pearl et al. |
| 2016/0094456 A1 | 3/2016 | Jain et al. |
| 2016/0094643 A1 | 3/2016 | Jain et al. |
| 2016/0105333 A1 | 4/2016 | Lenglet et al. |

(56) References Cited

U.S. PATENT DOCUMENTS

| | | | |
|---|---|---|---|
| 2016/0112374 A1* | 4/2016 | Branca | H04L 63/102 |
| | | | 726/1 |
| 2016/0149863 A1 | 5/2016 | Walker et al. | |
| 2016/0156591 A1 | 6/2016 | Zhou et al. | |
| 2016/0182454 A1 | 6/2016 | Phonsa et al. | |
| 2016/0191466 A1* | 6/2016 | Pernicha | H04L 63/20 |
| | | | 726/1 |
| 2016/0191570 A1 | 6/2016 | Bansal et al. | |
| 2016/0241702 A1 | 8/2016 | Gorajala Chandra et al. | |
| 2017/0004192 A1 | 1/2017 | Masurekar et al. | |
| 2017/0005867 A1 | 1/2017 | Masurekar et al. | |
| 2017/0005987 A1 | 1/2017 | Masurekar et al. | |
| 2017/0005988 A1 | 1/2017 | Bansal et al. | |
| 2017/0026283 A1 | 1/2017 | Williams et al. | |
| 2017/0064749 A1 | 3/2017 | Jain et al. | |
| 2017/0104720 A1 | 4/2017 | Bansal et al. | |
| 2017/0118173 A1 | 4/2017 | Arramreddy et al. | |
| 2017/0134422 A1 | 5/2017 | Shieh et al. | |
| 2017/0180319 A1 | 6/2017 | Nimmagadda et al. | |
| 2017/0180320 A1 | 6/2017 | Nimmagadda et al. | |
| 2017/0180321 A1 | 6/2017 | Nimmagadda et al. | |
| 2017/0180423 A1 | 6/2017 | Nimmagadda et al. | |
| 2017/0187679 A1* | 6/2017 | Basak | H04L 63/0218 |
| 2017/0250869 A1 | 8/2017 | Voellmy | |
| 2017/0317928 A1 | 11/2017 | Gude et al. | |
| 2017/0317976 A1 | 11/2017 | Chalvadi et al. | |
| 2017/0317977 A1 | 11/2017 | Popuri et al. | |
| 2017/0317979 A1 | 11/2017 | Bansal et al. | |
| 2017/0318055 A1 | 11/2017 | Popuri et al. | |
| 2018/0007000 A1 | 1/2018 | Bansal et al. | |
| 2018/0007007 A1 | 1/2018 | Bansal et al. | |
| 2018/0007008 A1 | 1/2018 | Bansal et al. | |

FOREIGN PATENT DOCUMENTS

| | | |
|---|---|---|
| JP | 2006040274 A | 2/2006 |
| JP | 2009017269 A | 1/2009 |
| JP | 2013012865 A | 1/2013 |
| KR | 20080100620 A | 11/2008 |
| WO | 2008095010 A1 | 8/2008 |
| WO | 2013074828 A1 | 5/2013 |

OTHER PUBLICATIONS

Guichard, J., et al., "Network Service Chaining Problem Statement," Network Working Group, Jun. 13, 2013, 14 pages, Cisco Systems, Inc.

Herndon, Joseph, "FairWarning IP, LLC v. Iatric Systems, Inc. (Fed. Cir. 2016)," Oct. 13, 2016, 3 pages.

Ioannidis, Sotiris, et al., "Implementing a Distributed Firewall," CCS '00, Month Unknown 2000, 10 pages, ACM, Athens, Greece.

Joseph, Dilip Anthony, et al., "A Policy-aware Switching Layer for Data Centers," Jun. 24, 2008, 26 pages, Electrical Engineering and Computer Sciences, University of California Berkeley, CA, USA.

Mayer, Alain, et al., "Offline Firewall Analysis," Int. J. Inf. Secur. (2006) 5(3), Jun. 16, 2005, 20 pages, Springer Verlag.

Scarfone, Karen, et al., "Guidelines on Firewalls and Firewall Policy: Recommendations of the National Institute of Standards and Technology," Special Publication 800-41, Revision 1, Sep. 2009, 48 pages, NIST, U.S. Department of Commerce.

Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.

Stojanovski, Nenad, et al., "Analysis of Identity Based Firewall Systems," Jun. 2010, 9 pages.

Stojanovski, Nenad, et al., "Architecture of A Identity Based Firewall System," Jul. 2011, 9 pages.

Thames, J. Lane, et al., "A Distributed Firewall and Active Response Architecture Providing Preemptive Protection," ACM-SE'08, Mar. 28-29, 2008, 6 pages, Auburn, AL, USA.

* cited by examiner

SELF-SERVICE FIREWALL CONFIGURATION

CLAIM OF BENEFIT TO PRIOR APPLICATIONS

The present application claims the benefit of U.S. Provisional Patent Application 62/330,151, filed May 1, 2016. U.S. Provisional Patent Application 62/330,151 is incorporated herein by reference.

BACKGROUND

In computing, a firewall is a network security system that monitors and controls the incoming and outgoing network traffic based on predetermined security rules. A firewall typically establishes a barrier between a trusted, secure internal network and another outside network, such as the Internet, that is assumed to not be secure or trusted.

Firewalls are often categorized as either network firewalls or host-based firewalls. Network firewalls are software appliances running on general-purpose hardware or hardware-based firewall computer appliances that filter traffic between two or more networks. Host-based firewalls provide a layer of software on one host that controls network traffic in and out of that single machine.

Software defined data center that provides network virtualization platform to different tenants also provide firewall services to those tenants. As these software defined data centers provide ever more networking and computing capacities to ever more tenants, the software defined data center has to configure and manage ever greater number of firewall rules in its networking and computing resources in order to serve the ever more complex security requirements of its tenants.

SUMMARY

Some embodiments of the invention provide a method for managing firewall configuration of a software defined data center that provides computing and networking resources to a plurality of tenants. Such a firewall configuration in some embodiments is divided into multiple sections that each contains a set of firewall rules. In some embodiments, each tenant of the software defined data center has a corresponding set of sections in the firewall configuration. The method allows each tenant to independently access and update/manage its own corresponding set of sections. Some embodiments allow multiple tenants or users to make changes to the firewall configuration simultaneously.

In some embodiments, the sections of the firewall configuration are prioritized. Specifically, when applying firewall service to a packet, the method identifies an applicable firewall rule by examining a higher priority section before examining a lower priority section. Some embodiments reserve the highest priority section and the lowest priority section of the firewall configuration for storing firewall rules that are applicable to all tenants. Some or all of the remaining sections are tenant-specific sections, each tenant-specific section storing firewall rules that are applicable to only one tenant in some embodiments.

Some embodiments allow each tenant to access or manage its corresponding set of sections of the firewall configuration by providing an application programming interface (API) to each tenant. Some embodiments allow each tenant to access or manage its corresponding set of sections by providing a user interface (UI) to each tenant. In some embodiments, such UI or API allows a tenant to (i) insert a section or rule to the firewall configuration, (ii) to remove a section or rule from the firewall configuration, or (iii) to edit a section or a rule that is specific to the tenant. In some embodiments, the API is REST (representational state transfer) compliant.

In some embodiments, a firewall configuration maintains a list of sections. This list of sections records the position of each section in the firewall configuration, i.e., the ordering by which the sections are examined for matching rule. In some embodiments, a tenant adds or deletes a section to the firewall configuration by updating the list of sections. Some embodiment receive multiple requests from UI/API to add/update multiple firewall sections. Some or all of these requests require assignment of priority to one or more sections in the firewall configuration, which in turn require making changes to the list of sections.

In some embodiments, the position value/priority numbers of the sections are sparsely allocated. The sparsely allocated priority numbers increase the likelihood that a newly added section can be assigned a unique priority number without affecting the priority numbers already assigned to other sections. This allows the insertion of a new section to be faster with lower latency. This also allows multiple different priority assignment tasks/activities to take place concurrently without interfering with each other, since each activity is free to assign a number from a gap without affecting the assignment of priority numbers by other activities. Some embodiments provide mechanisms such as rebalancing for maintaining the sparseness of the priority number assignment and hence maximize the probability that multiple priority assignment tasks can take place concurrently.

Some embodiments identifies the dependencies of each section-reordering firewall manage operation and places in queue only those section-reordering firewall manage operations whose priority assignment is dependent upon a section which has yet to be assigned a priority number. If a scheduled activity for assigning priority to a section does not depend upon priority assignment of another section or if the depended upon section already has known priority assignment, then the scheduled activity proceeds directly to execution without waiting for any other priority assignment tasks to complete.

In some embodiments, the ordering of sections in the firewall configuration is managed by using a binary search tree. The use of the binary search tree ensure that the addition or deletion of a section or a rule can be accomplished within a time period that is in the order of log(N), N being the number of sections. In some embodiments, the binary search tree is a complete binary search tree such that every possible priority number (both assigned and unassigned) has a unique corresponding node in the tree. In some embodiments, each node includes an indication of whether the priority number is assigned and which section it is assigned to.

Some embodiments, when assigning priority numbers to new incoming sections, use a greedy scheme would always leave as room as possible, e.g., by assigning a priority number that is right in the middle of the available space between the priority number immediately before and the priority number immediately after. Some embodiments record the sequence of section insertions and assign priority numbers based on the recorded sequence, i.e., by detecting the pattern of the section insertions. The assignment priority number for each section is chosen to minimize the possibility of running out of priority numbers to assign due to unbalanced sequence, i.e., to minimize collision of priority numbers between newly inserted section and sections already in the firewall configuration.

Some embodiments perform periodic rebalancing of the assigned priority numbers, i.e., to re-label at least some of the sections (or rules) with different priority numbers in order to create more room for subsequent section insertions. Such rebalancing also helps to ensure that the assignment of priority numbers to the different sections remain sparsely allocated. A firewall management process in some embodiments performs rebalancing when it is not able to assign a priority number to the newest section being inserted. Some embodiments perform rebalancing of the assigned priority number by re-distributing the keys uniformly (i.e., by reassigning the priority numbers to the sections in a uniformly spaced fashion while maintaining the original ordering). Some embodiments perform rebalancing by assigning more space (i.e., allocating more unassigned priority numbers) around the key assigned to the section whose insertion caused the rebalancing. Some embodiments use the binary search tree to segment the priority number space into ranges and to confine rebalancing operation into a smallest range necessary in order to maximize the probability that a priority assignment task may proceed without having to wait for the rebalancing operation.

In some embodiments, each firewall management process is implemented as an activity. Each activity is performing a task related to the management of the firewall configuration, and it maintains a state that reflects the different phases of its current firewall configuration management task. In some embodiments, each firewall configuration management activity is limited to operating on only one entity. In some embodiments, each activity is check-pointed in order to allow recovery of the activity from a saved check-point. In some embodiments, each activity reports to a controller of the software defined data center upon completion its execution.

Some embodiments launches an activity for managing a section of the firewall configuration when a tenant owning the section invokes an API at the network manager in order to access or update the section or the rules of the section. In some embodiments, the launched activity is placed in a queue with other activities that are managing the firewall configuration, where a queued activity is a background thread that is not executed immediately. In some embodiments, a firewall configuration management activity maintains a state that reflects the different phases of its current access to its corresponding section of firewall rules. An activity consists of internal state (or context) and a state machine that is defined in terms of phases and their interactions.

Such a firewall configuration managing activity is in some embodiments used for inserting a new section into the plurality of sections, deleting an existing section from the plurality of sections, or other types of firewall configuration management tasks that requires reordering of the sections. In some embodiments, a firewall configuration management activity manages the ordering of rules of its section by operating algorithms for solving list-labeling/order maintenance problems, e.g., by re-ordering the firewall rules in its corresponding section when it inserts or removes a rule, or by assigning priorities to firewall rules in its corresponding section.

In some of embodiments, each request that requires priority assignment to a section causes the network manager to schedule a corresponding activity, and each scheduled activity remains active in the background until the task of assigning the priority to the section is complete. The network manager returns a response to a user/tenant after the corresponding requested change to the firewall configuration has persisted (i.e., when the scheduled task has completed making changes to the storage of the firewall configuration). In some embodiments, multiple activities from multiple different tenants are executed in parallel/concurrently. Each priority assignment activity is free to proceed as long as the resources required by the task are available.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a method or system for managing firewall configuration of a software defined data center that provides computing and networking resources to a plurality of tenants or users. In some embodiments, each tenant of the software defined data center is allowed to independently access and update/manage its own set of firewall rules. The firewall configuration management system or method described in this document is in some embodiments concurrently updatable by multiple users and highly scalable with respect to the number of users/tenants. It also allows each user to manage its own firewall rules in a low latency manner.

Figure 1:
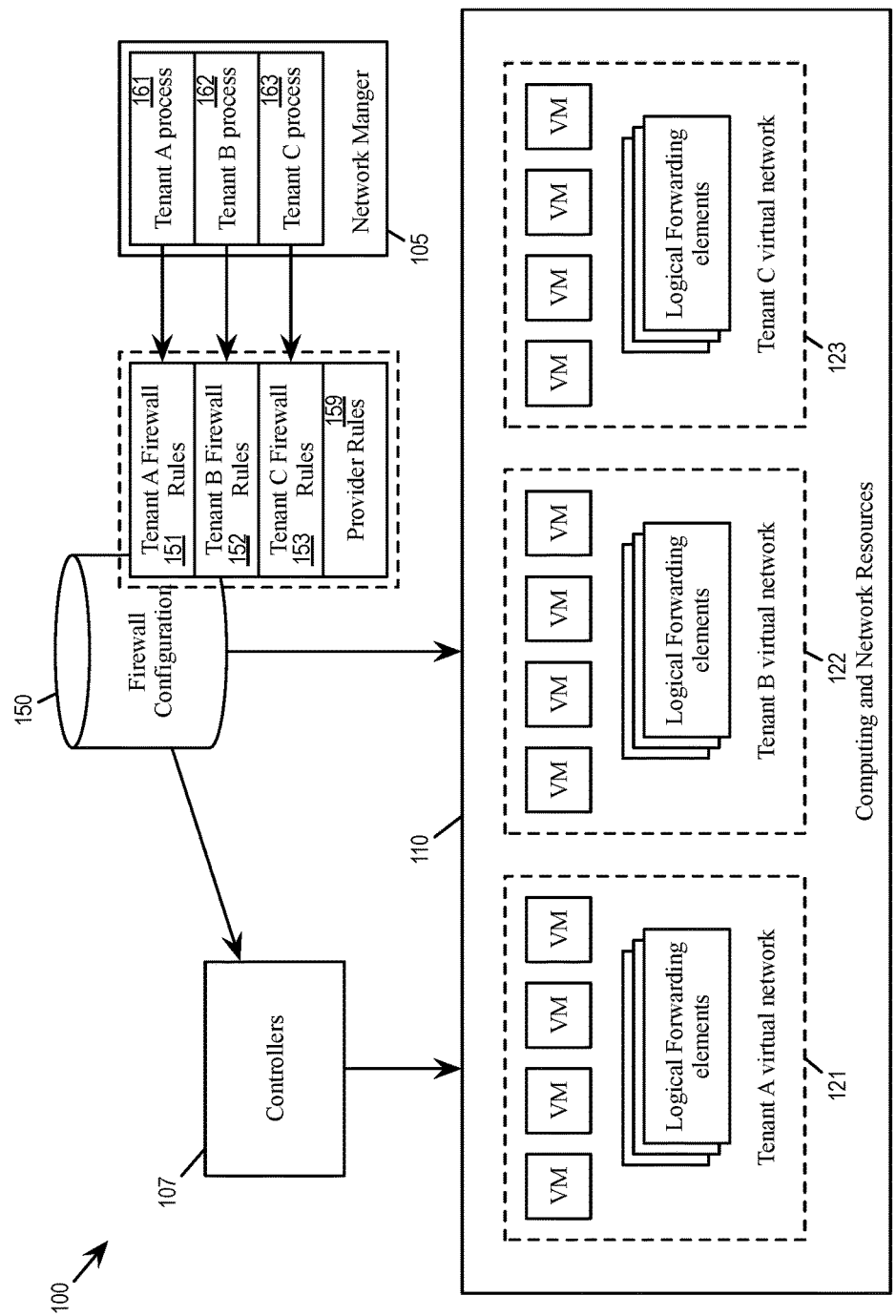
FIG. 1 illustrates the management of firewall configuration for a software defined data center.

FIG. 1 illustrates the management of firewall configuration for a software defined data center 100 according to some embodiments of the invention. As illustrated, the software defined data center 100 provides a pool of computing and network resources 110 to tenants A, B, C. The software defined data center also includes a network manager 105 and a set of controllers 107. The network manager 105 receives specification from users/network administrators/tenants and provide the corresponding configurations for the computing and network resources 110 in the data center as well as the set of controllers 107.

In some embodiments, each tenant using the computing and network resources of the software defined data center to implement its own set of virtual networks and virtual machines. In this example, the resources of the software defined data center are implementing tenant virtual networks 121, 122, and 123 for the tenants A, B, and C respectively. Each tenant's virtual network includes virtual machines (VMs) belonging to the tenant. Each tenant's virtual network is also a logical network that includes logical forwarding elements (logical routers and logical switches) for performing L2/L3 packet forwarding operations within the logical network and with other networks (such as the Internet).

The set of controller 107 is for controlling the real-time operations of the computing and network resources 110. Specifically, the central controller is controlling the virtual network components (i.e., logical forwarding elements, etc.) that are configured to operate in the computing and network resources. In some embodiments, the central controller 107 is a cluster of controllers, where each controller is responsible for some of the virtual network components.

The software defined data center 100 also provides firewall protection for its tenants. These firewalls filters network traffic according to rules that allows or disallows certain types of packets. In some embodiments that firewall protection is provided by distributed logical firewall that are implemented across multiple computing or networking resources (e.g., multiple host machines operating hypervisors or virtualization software). The operations of the firewalls in the data center 100 is based on the content of the firewall configuration 150, which defines and provides firewall rules.

The network manager 105 is responsible for maintaining a firewall configuration 150, which is used to configure the computing and network resources 110 of the data center 100 for implementing firewalls. The content of the firewall configuration, i.e., the firewall rules are published to the computing and network resources of the data center 100 so these resources can filter network traffic accordingly. The firewall configuration is also published to the set of controllers 107 so the controllers can control the real-time operations of the firewall in the computing and network resources.

Some embodiments allow each tenant to specify its own set of rules into the firewall configuration 150. As illustrated, the firewall configuration 150 implements a set of firewall rules 151 for tenant A, a set of firewall rules 152 for tenant B, and a set of firewall rules 153 for tenant C. The firewall configuration 150 also includes a set of provider rules 159 that are applicable to all tenants of the software defined data center. Some embodiments allow each of the tenants to manage its set of firewall rules. Some supports multiple concurrent processes for accessing the firewall configuration so each tenant would have its own process for managing its own set of firewall rules, and different tenants can simultaneously access the firewall configuration. As illustrated in FIG. 1, the network manager 105 of the data center 100, in addition to provisioning the various virtual machines and logical forwarding elements in the pool of computing and network resources 110, it also operates concurrent processes 161, 162, and 163 that allow tenants A, B, and C to each independently access its corresponding set of firewall rules 151, 152, and 153. The concurrent processes for updating the firewall configuration will be further described below in Sections I, II, and III.

In some embodiments, a software defined data center includes computing devices that can be configured to provide at least some of the computing and network resources for provisioning the VMs and the logical forwarding elements for the tenants of the data center. In some embodiments, each of these computing devices is operating virtualization software that enables the machine to host the various logical forwarding elements and VMs provisioned by the network manager for the various tenants (hence these computing devices are also referred to host machines). In some embodiments, these host machines are also configured by the data center's firewall configuration to filter packets according to the firewall rules in the firewall configuration. In some embodiments, the virtualization software of host machine performs the filtering of the packets that received by the host machine or generated by the host machine.

Figure 2:
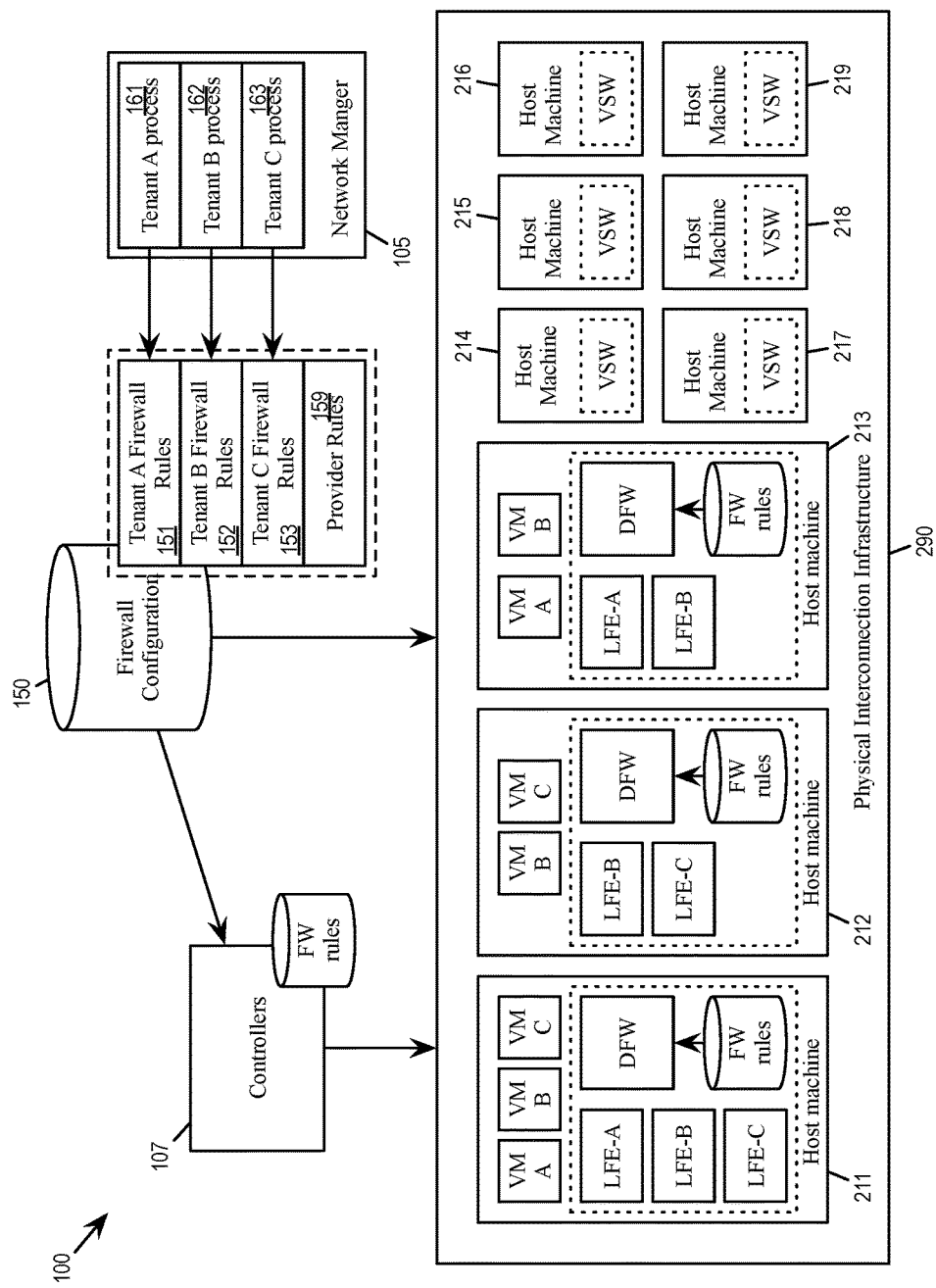
FIG. 2 illustrates host machines of the software defined data center.

For some embodiments, FIG. 2 illustrates host machines of the software defined data center 100 that are configured to implement VMs, logical forwarding elements, and firewalls. As illustrated, the software defined data center 100 includes host machines 211-219 that are interconnected by a physical interconnection infrastructure 290. Each host machine is operating virtualization software in order to host VMs.

Each of the host machines operates a set of VMs and logical forwarding elements (LFEs) for one or more tenants. For example, the host machine 211 operates VMs and LFEs for tenants A, B, and C, while the host machine 212 operates VMs and LFEs for tenants B and C only. LFEs of a tenant operated by a host machine can include L3 logical routers and L2 logical switches for the virtual network of that tenant. In some embodiments, a logical router of a tenant is implemented across multiple host machines in order to perform L3 routing for VMs of that tenant hosted by those multiple host machines, while a logical switch of a particular L2 network segment (e.g., a VNI) of a tenant is implemented across multiple host machines in order to perform L2 switching for VMs of that network segment on those multiple host machines. In some embodiments, a host machine performs the operations of a logical router by operating a local instance of the logical router as a physical router for routing packets to and from the VMs hosted by the host machine. In some embodiments, such a logical router is referred to as a logical routing element (LRE), and a local instance of the LRE operating in a host machine is referred to as a managed physical routing element (MPRE). In some embodiments, each host machine operates a managed physical switching element (MPSE) for performing L2 switching of packets to and from the VMs of the host machine.

As illustrated, each host machine is operating virtualization software in order to host the VMs (Virtualization software is also referred to as virtual machine monitors, hypervisors, or managed forwarding elements). The virtualization software of a host machine implements the LFEs of the host machine. In some embodiments, a host machine also operates a layer of software for filtering traffic in and out of the host machine (and to and from the virtual machines of the host machine). In some embodiments, the layer of traffic filtering software is part of the virtualization software.

The traffic filtering software of a host machine implements distributed firewall at that host machine. The distributed firewall operates according to the firewall configuration 150, which includes firewall rules for filtering packets. In some embodiments, the traffic filtering software of each host machine receives and/or stores a complete set of rules published by the firewall configuration 150 of the data center 100. In some embodiments, each host machine receives and/or stores only the rules that are relevant to the VMs and the LFEs operated by the host machine. For example, in some embodiments, a host machine receives and/or stores only firewall rules that are relevant to the tenants operating in that host machine. For example, the host machine 212 would store and operate only firewall rules relevant to tenants B and C (e.g., rule sets 152, 153, and 159), the host machine 213 would store and operate only firewall rules relevant to tenants A and B (e.g., rule sets 151, 152, and 159), while the host machine 212 would store and operate firewall rules relevant to all three tenants A, B, and C (151-153 and 159). In some embodiments, the central controller 107 also receives the published firewall rules from the firewall configuration in order to control the operation of the firewall in the host machines.

Several more detailed embodiments of the invention are described below. Section I discusses the concurrent updating of the firewall configuration that is divided into sections. Section II describes efficient updating of firewall rules in the firewall configuration. Section III describes implementing each of the concurrent firewall management processes as an activity. Section IV describes a computing device that operates virtualization software and serves as a host machine. Finally, section V describes an electronic system with which some embodiments of the invention are implemented.

I. Firewall Configuration by Sections

In some embodiments, the firewall configuration of a software defined data center is divided into multiple sections that each contains a set of firewall rules. Some embodiments allow different concurrent processes to manage different sections of the firewall rules. In some embodiments, the updating of a section (e.g., adding/removing/updating rules within the section) would not affect the firewall operations based on other sections. In some embodiments, each tenant of the software defined data center has a corresponding set of sections in the firewall configuration. Each tenant is allowed to independently access and update/manage its own corresponding set of sections.

Figure 3:
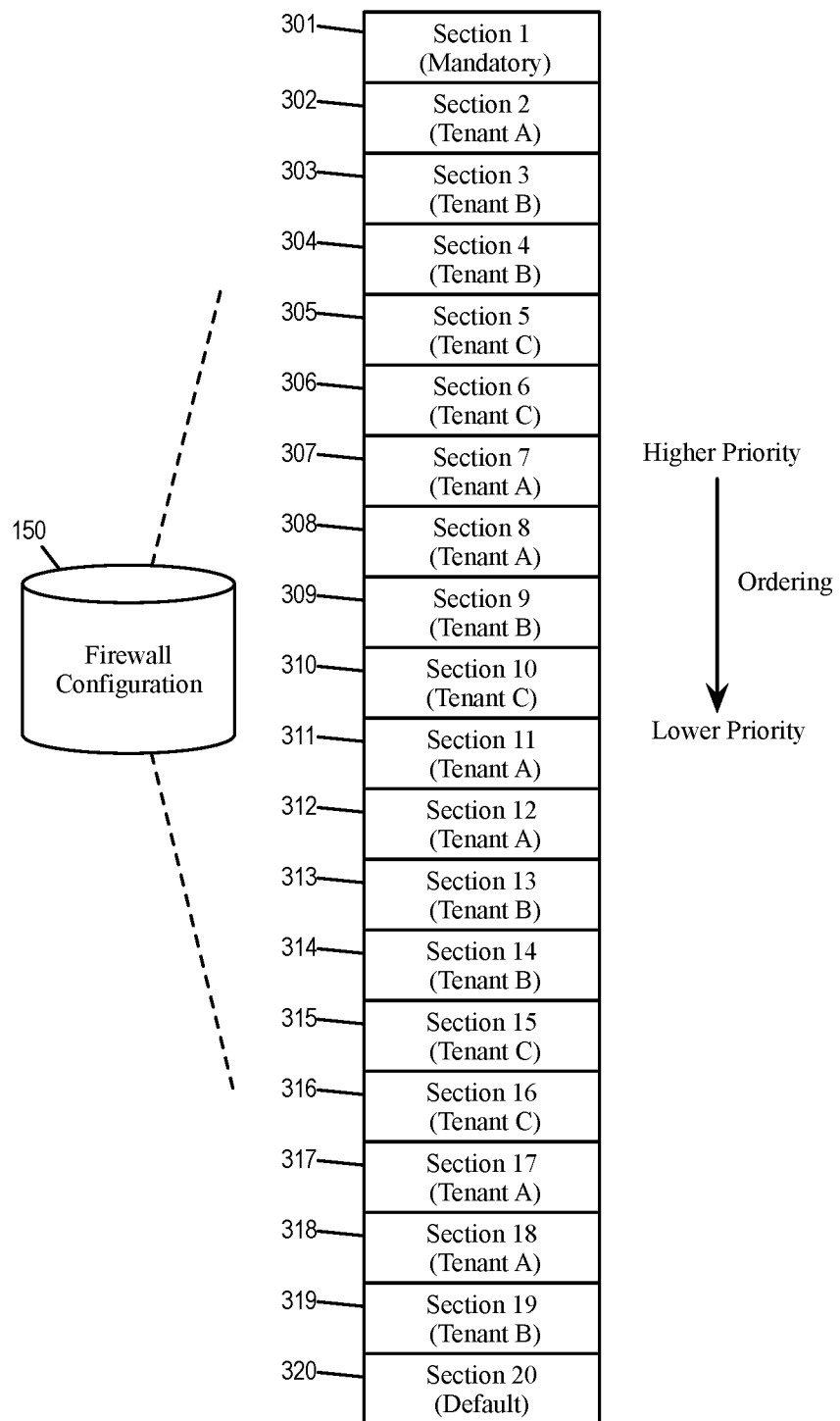
FIG. 3 illustrates a firewall configuration that is divided into sections.

FIG. 3 illustrates a firewall configuration that is divided into sections. The figure describes the firewall configuration 150 in greater detail according to some embodiments of the invention. Specifically, the firewall configuration 150 is divided into sections 301-320. In this example, the sections 302, 307, 308, 311, 312, 317, and 318 are for storing firewall rules of tenant A; the sections 303, 304, 309, 313, 314 319 are for storing firewall rules of tenant B; the sections 305, 306, 310, 315, 316 are for storing firewall rules of tenant C. Sections 301 and 320 are for storing provider firewall rules that are applicable to all tenants of the software defined data center (the software defined data center is also referred to as the service provider).

In some embodiments, the sections of the firewall configuration are ordered or prioritized. Specifically, when applying firewall service to a packet, the method identifies an applicable firewall rule by examining a section with a higher priority before examining a section with a lower priority. Some embodiments reserve the highest priority section and the lowest priority section of the firewall configuration for storing firewall rules that are applicable to all tenants. Some or all of the remaining sections are tenant-specific sections, each tenant-specific section storing firewall rules that are applicable to only one tenant in some embodiments.

In the example of FIG. 3, the section 301 is the highest priority section, and the section 320 is the lowest priority section. In other words, when performing packet filtering operations within a software defined data center according to the firewall configuration 150, rules of the section 301 will be examined first, then section 302, etc., until a rule that definitively allows or a disallows the packet is found, or until the last rule of the section 320 has been reached.

The highest priority section 301, i.e., the section whose rules will be examined before all other sections, is a mandatory rules section. These are rules that are imposed by the software defined data center on all tenants. An applicable rule in the mandatory section supersedes all tenant rules. In some embodiments, a packet that matches one of the rules of the highest priority section will be rejected or allowed based on that matched rule without regard to any rules in other sections.

The lowest priority section 320, i.e., the section whose rules will be examined after all other sections, is a default rules section. These are rules that are provided by the software defined data center to all tenants as the default rules. A packet in a tenant's virtual network would be rejected or allowed based on these default rules if the none of the rules specified by the tenant is applicable to the packet. In some embodiments, a packet that matches none of the rules specified by any tenant and none of the mandatory rules would be rejected or allowed based on the rules of the default section.

Since sections are ordered based on priorities and the rules in higher priority sections are examined for matching rules before rules in lower priority sections, any update to higher priority sections or higher priority rules will affect the applicability of the rules in lower priority sections, unless the rules are orthogonal with each other.

In some embodiments, sections belonging to different tenants are regarded as orthogonal to each other, i.e., rules in a section belonging to one tenant can never supersede rules in a section belonging to another tenant, regardless of the relative priority of the two sections. For example, through the tenant A section 308 is of higher priority than the tenant B section 313 and therefore examined first, the rules in the section 308 can never affect the applicability of rules in the section 313, because tenant A firewall rules can never apply to tenant B packets anyways. This allows each tenant to freely manage/edit/update its own firewall rule sections without affecting other tenants. In some embodiments, this also enables more efficient provisioning of distributed firewall, i.e., by configuring each host machine with only the necessary sections of the firewall configuration. In other words, a host machine would only receive and store sections of the firewall configuration that is relevant to its operation, not those sections that are not relevant to its operation.

The firewall configuration illustrated in FIG. 3 shows the sections from different tenants interspersed among each other. In some embodiments, the sections of the different tenants are adjacent to each other in the firewall configuration. In some embodiments, the user interfaces of the network manager of the software define data center would present the different sections of a tenant together as one cluster, regardless of their actual position in the firewall configuration.

Figure 4:
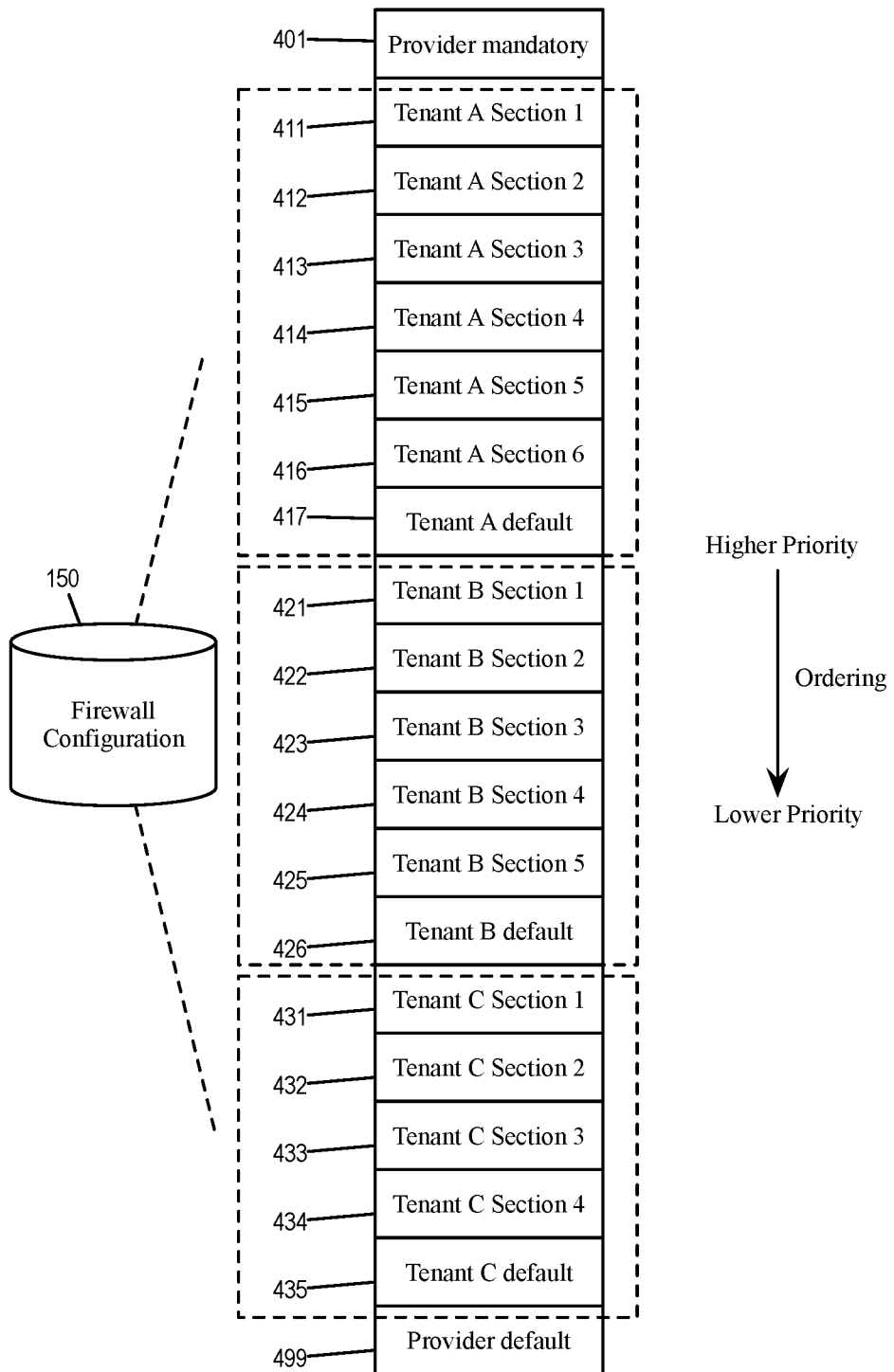
FIG. 4 illustrates a firewall configuration in which sections belonging to one tenant are clustered together.

FIG. 4 illustrates a firewall configuration in which sections belonging to one tenant are clustered together. As illustrated, the clustered sections 411-417 are all sections storing firewall rules of tenant A, the clustered sections 421-426 are all sections storing firewall rules of tenant B, and the clustered sections 431-435 are all sections storing firewall rules of tenant C. Each tenant can therefore easily identify the location of its firewall configuration sections at the user interface. The ordering of sections in the firewall configuration 400 also shows their relative priority, i.e., the rules of section 411 will be examine before the rules of section 412, etc., and the rules in tenant A's sections will be examined for matching rules before the rules in tenant B's sections, and the rules in tenant B's sections will be examined for matching rules before rules in tenant C's sections (the ordering between different tenants is unimportant since rules of different tenants are orthogonal to each other.) All tenant rules are examined after the provider mandatory section 401 and before the provider default section 499.

Since each tenant has its own set of sections in the firewall configuration, the lowest priority section among a tenant's set of sections can be regarded as the tenant's default section since it is the last of the tenants sections examined for matching rules (the provider default section 499 is still the last section examined for matching rules for all tenants). In some embodiments, the network manager provides each tenant a tenant default section before the tenant add sections or firewall rules of its own. In the example of FIG. 4, the section 417 is the tenant default section for tenant A, the section 426 is the tenant default section for tenant B, and the section 435 is the tenant default section for tenant C. In the example of FIG. 3, the section 318 is the tenant default section of tenant A, the section 319 is the tenant default section of tenant B, and the section 316 is the default tenant section of tenant C.

Figure 5:
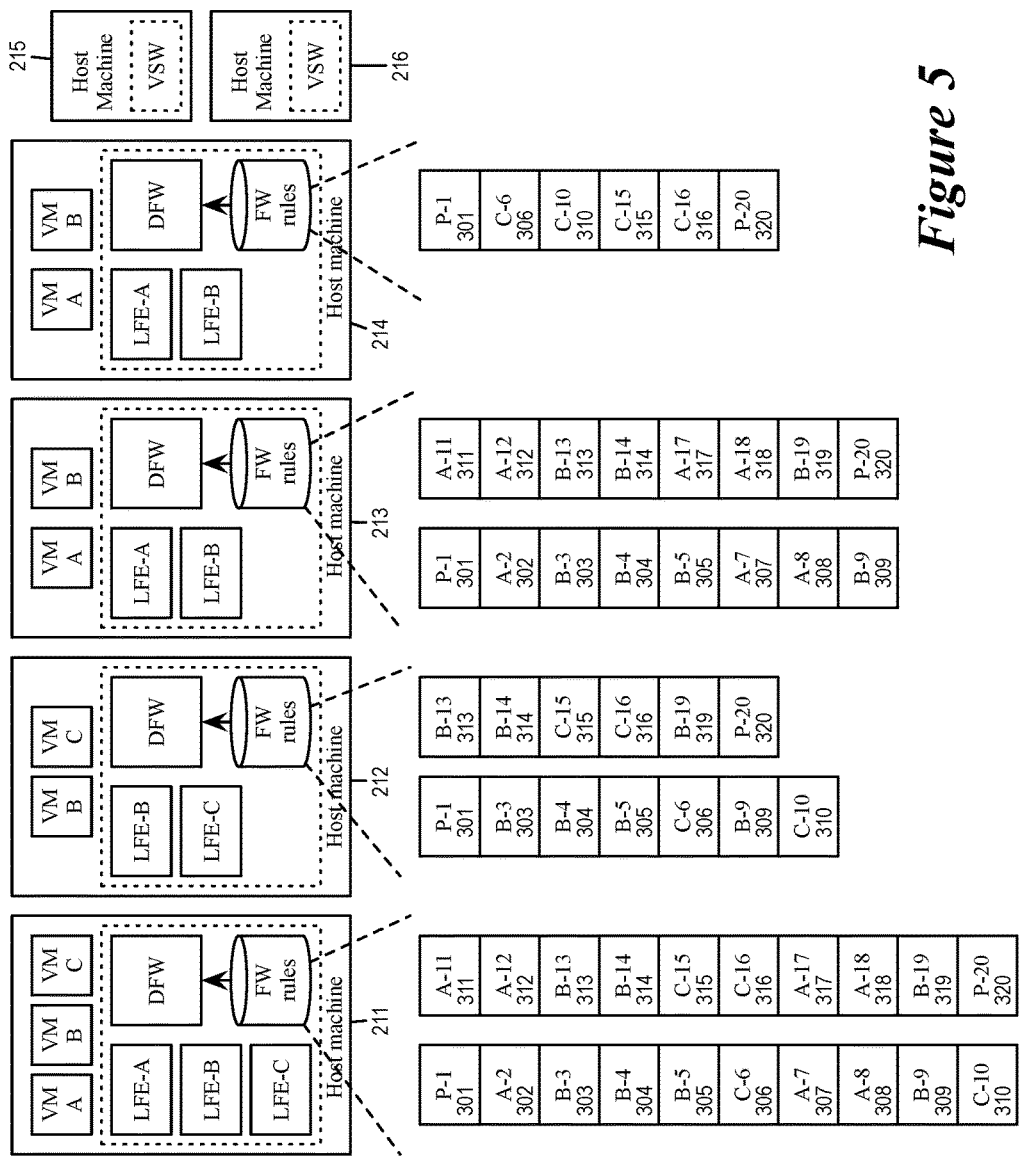
FIG. 5 illustrates provisioning of distributed firewall according to the sections of the firewall configuration.

FIG. 5 illustrates provisioning of distributed firewall according to the sections of the firewall configuration (based on the example of FIG. 3). The example shows the provisioning of the distributed firewall in host machines 211-219 according to the firewall configuration 150. As illustrated, the host machine 211 operates VMs and LFEs for tenants A, B, and C, so it receives and stores firewall configuration sections 302-319 for tenants A, B, and C as well as the provider sections 301 and 320. The host machine 212 operates VMs and LFEs for tenants B and C, so it receives and stores firewall configuration sections 303-306, 309-310, 313-316, and 319. The host machine 213 operates VMs and LFEs for tenants A and B, so it receives and stores firewall configuration sections 301-304, 307-309, 311-314, 317-320. The host machine 214 operates VMs and LFEs for only tenant C, so it receives and stores firewall configuration sections 301, 305-306, 310, 315-316, and 320.

In some embodiments, the firewall rules used by a host machine do not correspond to the tenants that own the VMs and/or the LFEs operating on that host machine. For example, a particular host machine can be configured to operate as an edge of a logical network or of the entire provider network. Such an edge host machine may have to perform firewall operations for all tenants but does not host any VMs or LFEs for those tenants. This particular host machine would therefore receive and store firewall configuration sections for all tenants.

In some embodiments, not only sections belonging to different tenants are orthogonal to each other, some of the different sections belonging to a same tenant are also orthogonal to each other. For example, a tenant's virtual network can have different L2 segments that each has its own corresponding section in the firewall configuration. Rules that are applicable to packets in one L2 segment can never be applicable to packets of another L2 segment. As another example, a tenant can have set of rules that are specific to a host machine and another set of rules that are specific to another host machine. Some embodiments allow these different rules for different host machine to be in different sections of the firewall configuration. This allows each host machine to be configured by only the relevant firewall configuration section. This also allows different orthogonal sections to be managed and updated by different concurrent processes.

Figure 6:
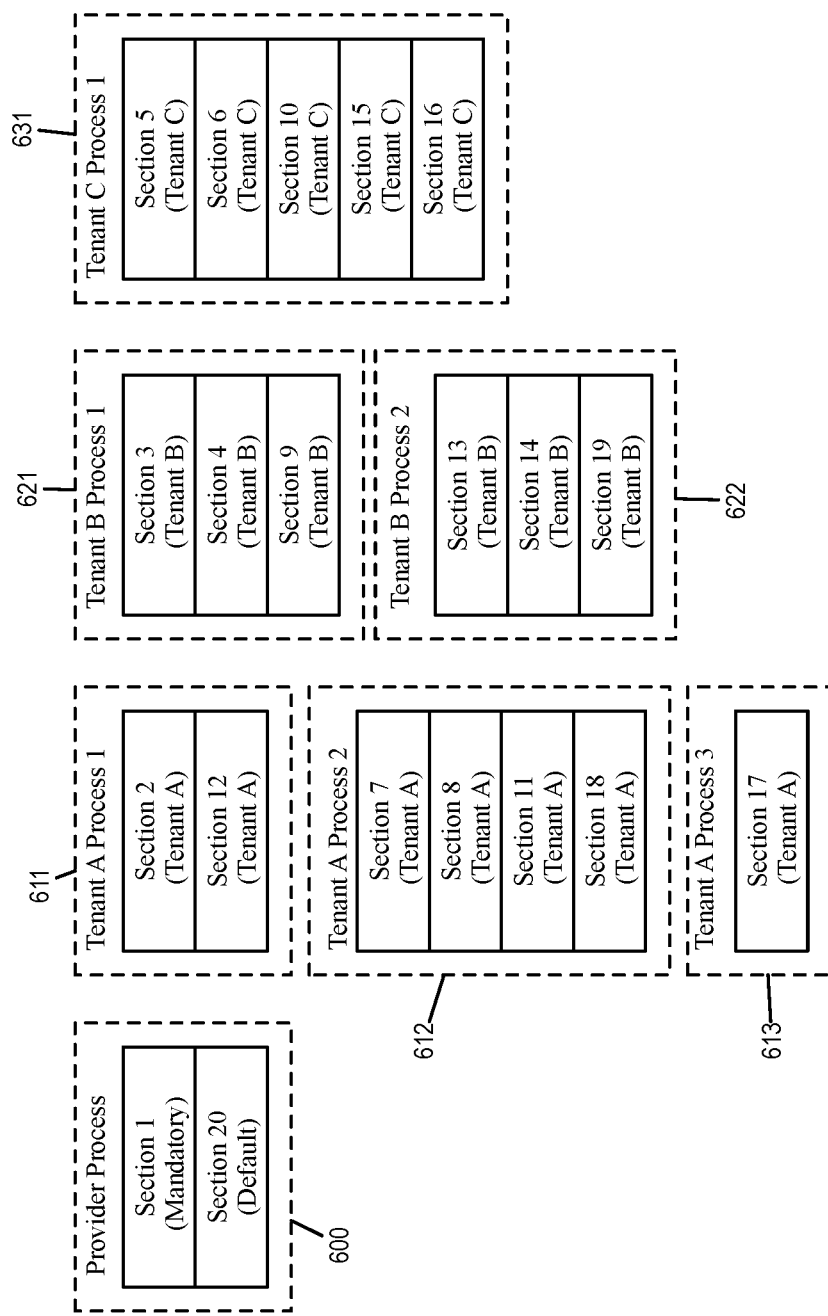
FIG. 6 illustrates different firewall sections being managed by different concurrent processes.

FIG. 6 illustrates different firewall sections being managed by different concurrent processes. Different processes belonging to different tenants manage different sections of the firewall configuration 150. The figure illustrates several such processes: a provider process 600, three tenant A processes 611-613, two tenant B processes 621-622, and one tenant C process 631.

As illustrated, the sections belonging to tenant A (302, 307, 308, 311, 312, 317, 318) are managed by tenant A processes (611-613); the sections belonging to tenant B (303-305, 309, 313-314, 319) are managed by tenant B processes (621-622); the sections belonging to tenant C (306, 310, 315, 316) are managed by tenant C processes (631). Some tenants have multiple firewall management processes. For example, the firewall rules of tenant A have three sets of sections. The first set of sections (302 and 312) is managed by the process 611, the second set of sections (307, 308, 311, 318) is managed by the process 612, and the third set of sections (317) is managed by the process 613.

As mentioned, sections belonging to different tenants are orthogonal to each other. Also, some sections belonging to the same tenant can be orthogonal with each other. In some embodiments, this allows each process to manage its own set of sections without affecting the firewall operations based on other sets of sections.

Figure 7:
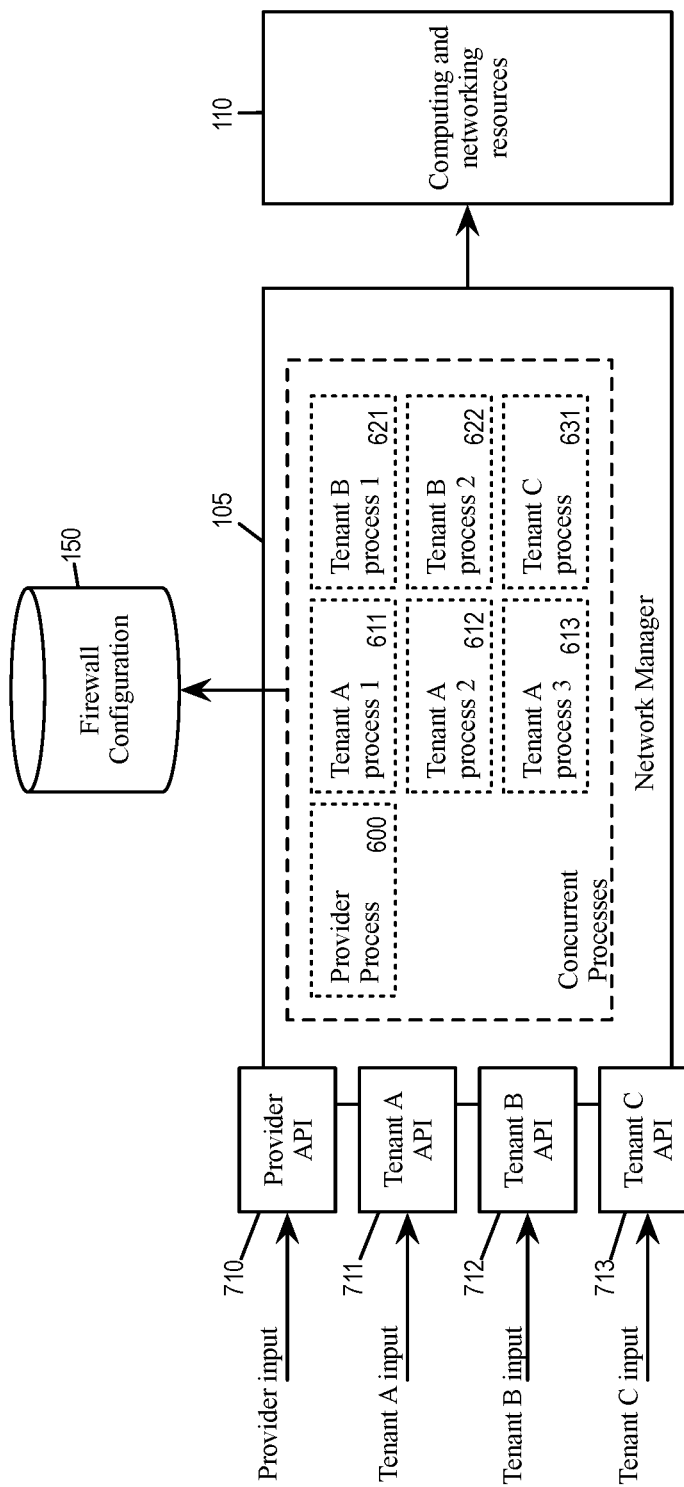
FIG. 7 conceptually illustrates the network manager of the software defined data center receiving inputs from tenants and updating firewall configuration accordingly.

FIG. 7 conceptually illustrates the network manager 105 of the software defined data center 100 receiving inputs from tenants and updating firewall configuration 150 accordingly. The network manager 105 provides user interface elements 710-713 to tenants so each tenant can specify its firewall rules in the firewall configuration 150. The network manager 150 in turn uses the content of the firewall configuration to provision or configure distributed firewall operations in the computing and networking resources (e.g., host machines) of the data center 110.

The user interface elements provided to tenants convert input from the tenants into concurrent firewall management processes 611-631 operated by the network manager 105 for managing the various sections of the firewall configuration. Each of these processes is assigned to manage a set of sections of the firewall configuration, and can be responsible for inserting, deleting, or modifying rules in its assigned sections. In some embodiments, the user interface element provided to a tenant also allows the tenant to delete or add sections belonging to the tenant.

As illustrated, the network manager 105 provides an API as the user interface element to each of the tenants A, B, or C (tenant APIs 711, 712, and 713, respectively). The network manager 105 also provides an API (provider AP 710) to the administrator of the software defined data center. The tenant A API 711 has launched the firewall management processes 611, 612 and 613 for tenant A. The tenant B API 712 has launched the firewall management processes 621 and 622 for tenant B. The tenant C API 713 has launched the firewall management process 631. In this example, each tenant is allowed to have multiple concurrent firewall management processes for managing different sections that are orthogonal to each other. In some embodiments, each tenant has only one firewall management process for managing all of its sections in the firewall configuration.

In some embodiments, once a tenant has specified an operation (e.g., remove a section, add a rule, etc.), the network manager would launch a corresponding process to access the firewall configuration. This process would remain active in the background until the operation specified by the tenant is complete. In some embodiments, the different tenants can concurrently input firewall specifications regarding the firewall configuration through their respective user interface elements. In some embodiments, the firewall management processes launched by the user interface elements of different tenants are concurrently executed (by the network manager).

Different embodiments provide different types of user interface experience through different types of user interface elements in order to allow administrators or tenants to specify firewall rules and/or firewall configuration sections. In the example illustrated in FIG. 7, the user interface elements provided to the tenants are APIs. In some embodiments, the API is REST (representational state transfer) compliant. In some embodiments, the network manager provides other forms of user interface element to the tenants, such as graphical user interface (GUI) or other types of user interfaces.

In some embodiments, the user interface element provide firewall manage operations that allows a tenant to (i) insert a section or rule to the firewall configuration, (ii) to remove a section or rule from the firewall configuration, or (iii) to edit a section or a rule that is specific to the tenant. In some embodiments, the user interface element also allows a tenant to get (i.e., read) the content of a particular section, or to get a list of the sections currently in the firewall configuration.

Figure 8:
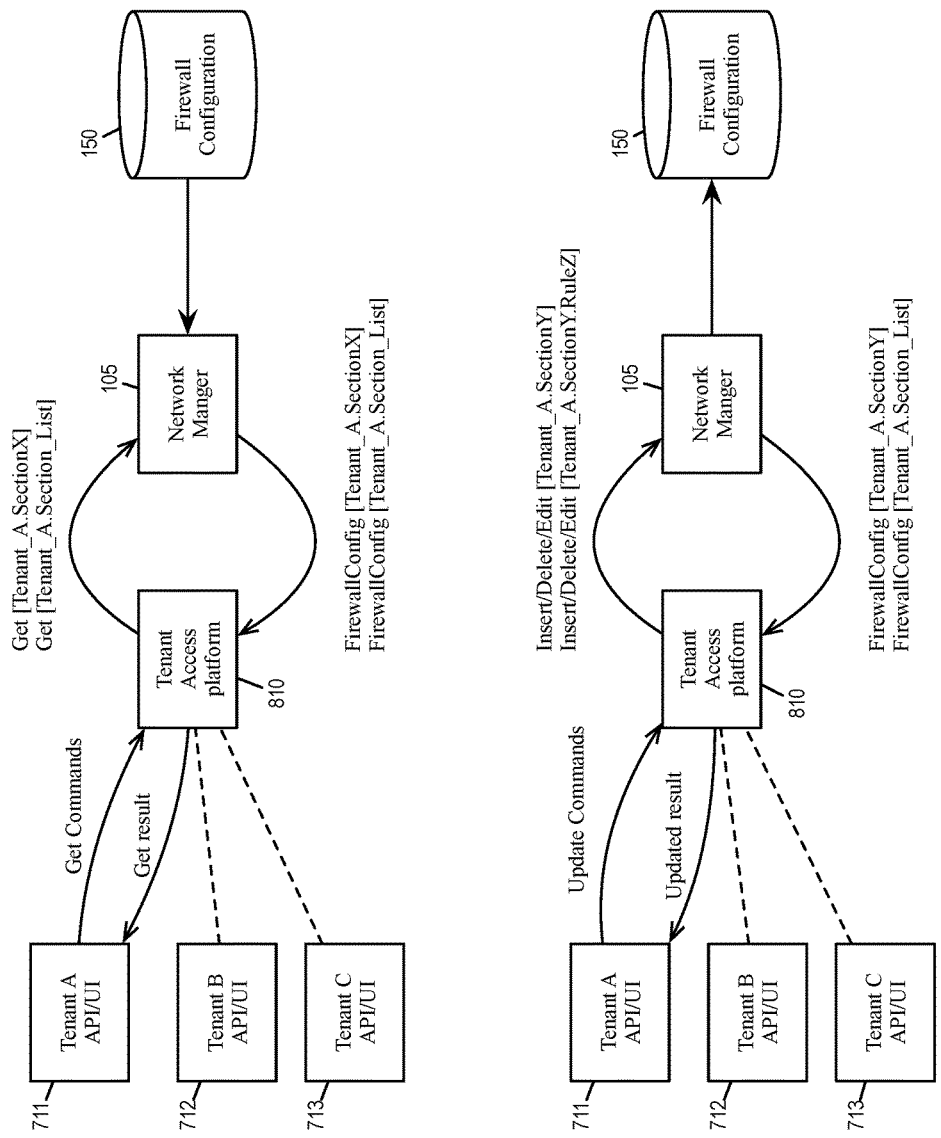
FIG. 8 illustrates firewall management operations that are provided to the tenants of a software define data center.

FIG. 8 illustrates firewall management operations that are provided to the tenants of a software define data center. As illustrated, the network manager 105 of the software defined data center 100 provides a tenant access platform 810 for receiving tenant data from tenants A, B, and C and for delivering data back to those tenants. Each tenant uses a user interface element (illustrated as tenant APIs 711-713, but can be UIs as well) to specify data to be sent to the data center 100, including commands/data related to the firewall configuration. The network manager 105 receives those tenant data via the tenant access platform 810 and performs operations related to the firewall configuration 150 accordingly.

In some embodiments, the user interface element that allows a tenant to specify its own firewall rules and firewall configuration sections are provided by a tenant access platform. In some embodiments, such a tenant access platform allows users (i.e., tenants) to access, configure, and control their respective virtual networks in the software defined data center through the Internet or the Cloud, i.e., the tenant access platform is a cloud-computing platform in some embodiments.

The figure illustrates two types of operations: "get" operations, which retrieve data from the firewall configuration; and "update" or "put" operations, which modify firewall configuration. Examples of "get" operations illustrated include "Get [TenantA.SectionX]", which is an operation that read the content of a particular section of a tenant; and "Get [TenantA.SectionList]", which is an operation that produces a list of sections that belong to a particular tenant in the firewall configuration.

Examples of "put" operations illustrated include "Insert [TenantA.SectionY]", which is an operation that adds a section for a particular tenant into the firewall configuration; "Delete [TenantA.SectionY]", which is an operation that remove a section of a particular tenant from the firewall configuration; "Edit [TenantA.SectionY.RuleZ]", which is an operation that modifies a packet filtering rule in a particular section of tenant A. In some embodiments, upon the conclusion of an update operation to the firewall configuration, the network manager also produces the content of the updated firewall configuration section or the updated list of sections as confirmation to the tenant.

By dividing the firewall configuration into sections and letting each tenant update its corresponding set of sections, each tenant is able to control and make changes to its own firewall rules in its own firewall configuration sections without affecting other tenants and without having to lock the entire firewall configuration. As mentioned, in addition to allowing each tenant to make changes to the rules in its sections, some embodiments also allow each tenant to add or delete a section in the firewall configuration. However, unlike making changes to rules within a firewall configuration section, adding or deleting a firewall configuration section does affect the firewall operation of other tenants.

In some embodiments, a firewall configuration maintains a list of sections. This list of sections records the position of each section in the firewall configuration, i.e., the ordering by which the sections are examined for matching rule. In some embodiments, a tenant adds or deletes a section to the firewall configuration by updating the list of sections.

Figure 9:
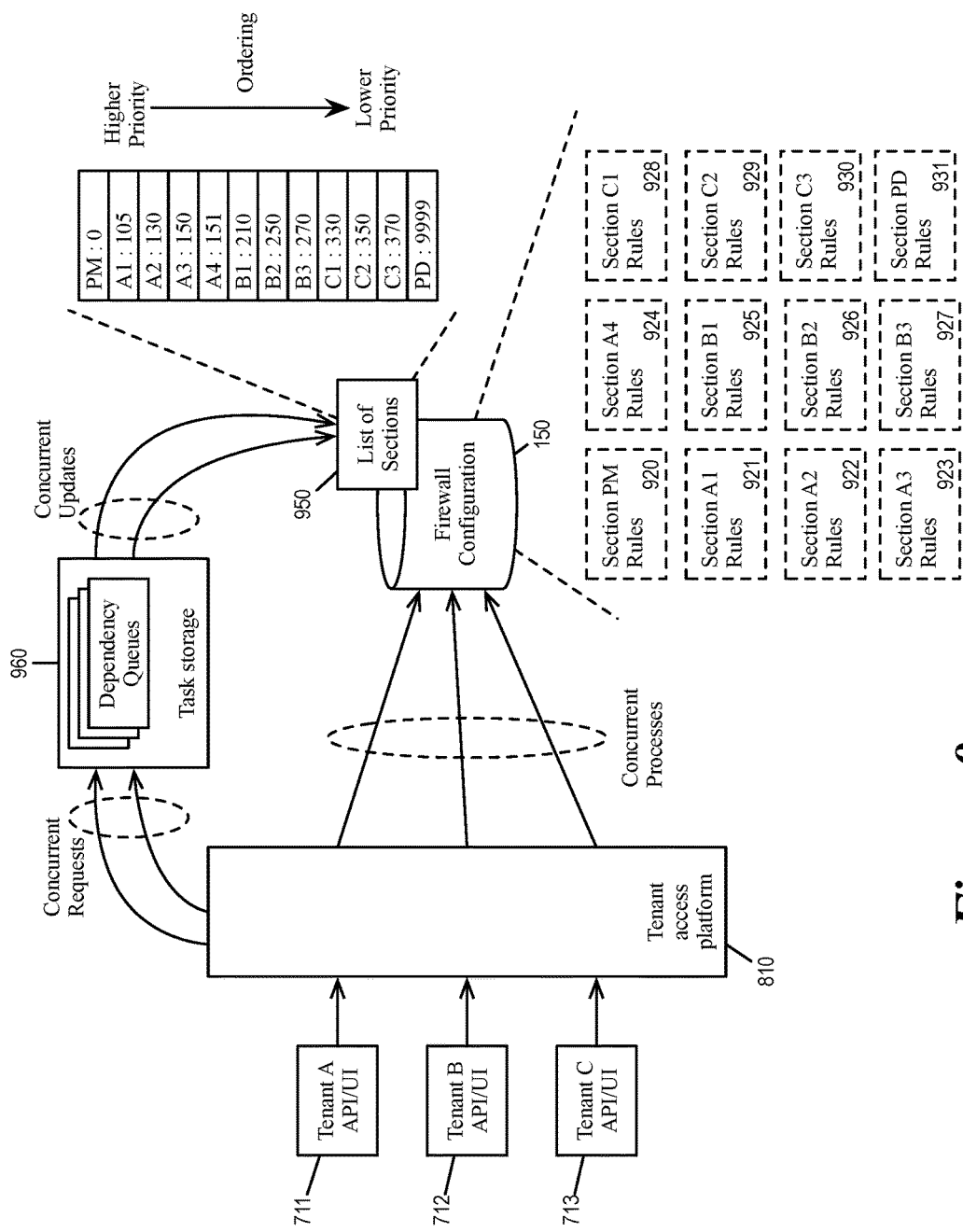
FIG. 9 illustrates a firewall configuration that maintains a list of sections for recording the position of each section in the firewall configuration.

FIG. 9 illustrates a firewall configuration that maintains a list of sections for recording the position of each section in the firewall configuration. In some embodiments, firewall configuration management operations that affect ordering between the sections (such as adding or deleting a section) are scheduled as activities that make changes to the list of sections. On the other hand, firewall configuration management operations that do not affect the ordering between the sections (such as updating rules in a section) are performed without regard to the list of sections and can be performed concurrently with other firewall management operations from other tenants.

As illustrated, the firewall configuration 150 has an associated list of sections 950. The firewall configuration 150 stores the rules of various sections 920-931 (sections A1-A4, B1-B3, C1-C3, PD, and PM), and the ordering between these various sections 921-931 are stored in the list of sections 950. The tenant access platform 810 receives requests to perform firewall configuration management operations from tenants A, B, and C through their corresponding APIs 711-713, and allows firewall manage operations that do not involve reordering of sections to proceed directly and concurrently to access the firewall configuration 150. For each firewall management operations that do require reordering of sections, some embodiments schedules as priority assignment task in order to access the list of sections 950. The scheduled priority assignment task is stored along other scheduled priority assignment tasks in a tasks storage 960.

The list of sections 950 lists the position of each section in the firewall configuration, i.e., the position of a section corresponds to the order by which the section is examined for matching rules relative to other sections. In some embodiments, each section has a corresponding position value in the list of sections. In some embodiments, the position value of a section is also its priority number that reflects the ordering by which the sections are to be examined for matching firewall rules. As such, making changes to the list of sections comprises assigning or modifying priority number(s) of one or more sections in order to maintain the correct ordering of the sections of the firewall configuration. In some embodiments, the task of assigning a priority number to a newly added section also includes modifying the priority numbers already assigned to the existing sections of the firewall configuration. Section II below further describes the assignment of priority numbers to sections. In some embodiments, the task of assigning a priority number to a newly added section is scheduled as an activity. Section III below further describes activities for managing firewall configuration.

In some embodiments, the position value/priority numbers of the sections are sparsely allocated, i.e., sections that are consecutive in the ordering of examination do not have consecutive priority numbers, though higher numbers do reflect higher priority than lower numbers in the ordering. The sparsely allocated priority numbers increase the likelihood that a newly added section can be assigned a unique priority number without affecting the priority numbers already assigned to other sections. This allows the insertion of a new section to be faster with lower latency. This also allows multiple different priority assignment tasks/activities (from different tenants) to take place concurrently without interfering with each other, since each activity is free to assign a number from a gap without affecting the assignment of priority numbers by other activities.

In some embodiments, a range of possible priority numbers is considered sparsely allocated if no two sections are assigned consecutive priority numbers within that range. This guarantees that a newly added section whose intended position is within that range can find an available priority number without collision. In some embodiments, a range of possible priority numbers is considered sparse even if some of the assigned priority numbers are consecutive, as long as there are enough slacks (i.e., unassigned priority numbers) in the range such that the priority numbers in the range can be redistributed/rebalanced/reassigned/re-labeled into a new allocation in which a gap of unassigned priority numbers always exists between any two assigned priority numbers.

Figure 10:
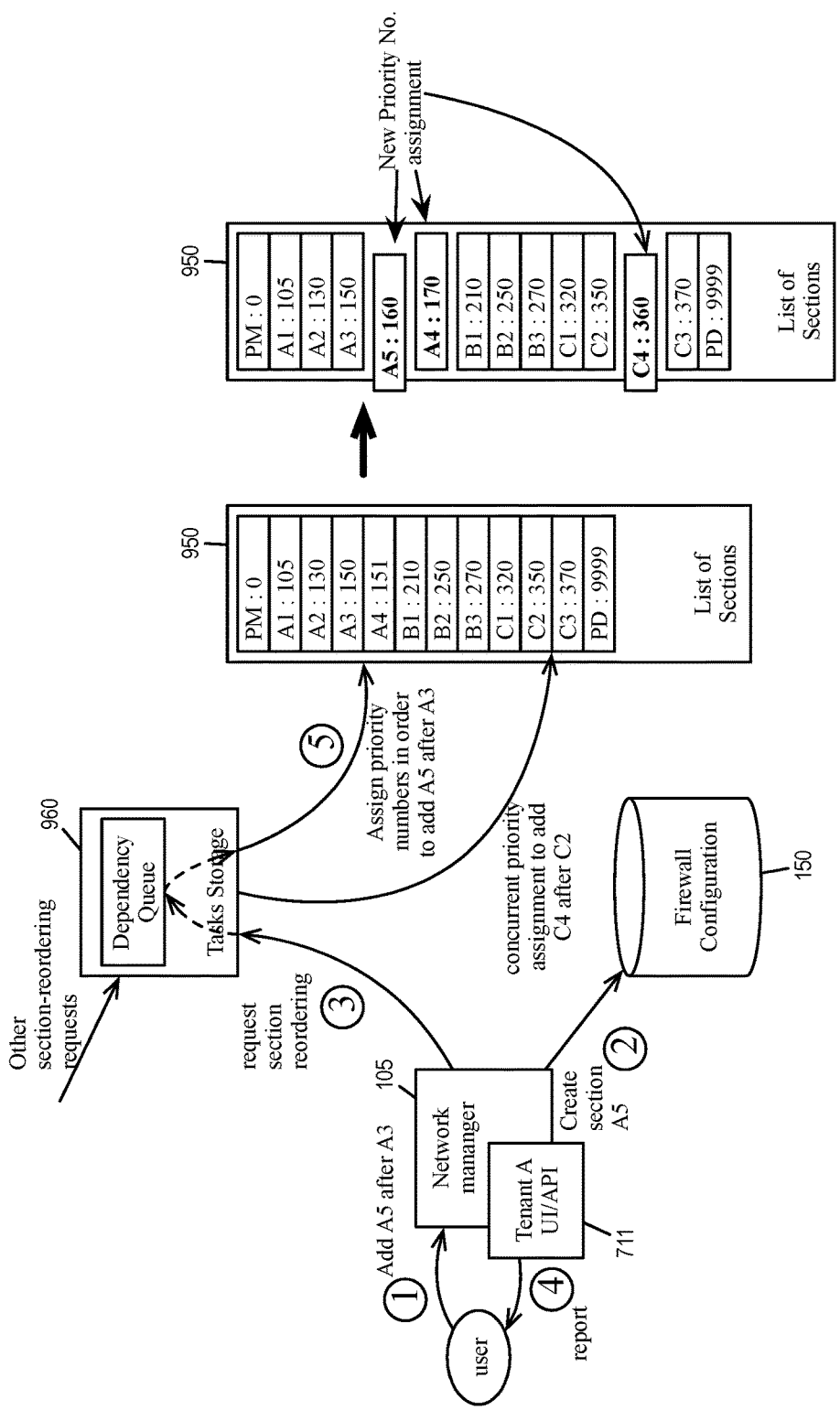
FIG. 10 illustrates a sequence of operations performed by some embodiments when a user/tenant initiates a firewall configuration management operation at its UI/API.

As illustrated in FIGS. 9 and 10, the list of sections 950 indicates that the sections 920-931 respectively have position values (or priority values) 0, 105, 130, 150, 151, 210, 250, 270, 320, 350, 370, and 9999. These values are sparsely allocated (i.e., there are gaps between the assigned priority numbers so they are not consecutive), but they nevertheless reflects the ordering/priority between the different sections such that a section with a higher (smaller) number will be examined before a section with a lower (larger) number.

In order ensure that different tenants can insert their own sections concurrently, some embodiments allot each tenant its own range of permissible priority numbers for sections. In the example of FIGS. 9 and 10, tenant A is allotted a range between 100-199, tenant B is allotted a range between 200-299, and tenant C is allotted a range between 300-399. As such, for example, as long as the range 200-299 remain sufficiently sparse, any of tenant B's firewall management operations will not interfere with any of tenant A's or tenant C's firewall management operations, and the firewall management operations of the three tenants can proceed concurrently. This is analogous to the fact that different tenants can always concurrently update the rules within the sections, since each of the different tenants can only access the rules of its own sections.

Some embodiments identifies the dependencies of each section-reordering firewall manage operation and places in queue only those section-reordering firewall manage operations whose priority assignment is dependent upon a section which has yet to be assigned a priority number. If a scheduled activity for assigning priority to a section does not depend upon priority assignment of another section or if the depended upon section already has known priority assignment, then the scheduled activity proceed directly to execution without waiting for any other priority assignment tasks to complete.

In some embodiments, a scheduled task only has to wait for earlier scheduled tasks that it depends on. For example, say there is an earlier scheduled task "adding a section A3". A subsequently scheduled task "adding a section A5 at a position following A3" must sit in a queue to wait for the earlier scheduled task "adding a section A3" to complete before it can execute. However, it would not have to wait for the task "adding a section B3 at a position before B4" to complete, since the priority assignment of section A5 does not depend on priority assignment of section B3. This optimization further reduces the latency when a user/tenant is managing its firewall configuration sections through its corresponding UI/API.

As illustrated in FIG. 9, the task storage 960 includes a set of dependency queues. A priority assignment task (i.e., section re-ordering request) that depends on another priority assignment task has to sit in a dependency queue until all of the depended priority assignment tasks is finished (or until all of the depended sections have known priority numbers), while tasks that does not depend on the priority number of other section can proceed immediately to execution and access the list of sections without waiting in a queue. In some embodiments, tasks that are in a chain of dependencies will be waiting in a same dependency queue and be executed in sequence based on the dependency.

Some embodiments provide multiple dependency queues for different tenants/users. This is because a tenant typically would initiate firewall management operations that depend on the priority numbers of its own sections but not the priority number of other tenants' sections. In some of these embodiments, each tenant would use its own dependency queue in the task storage 960. In some embodiments, a tenant may have multiple dependency queues in the tasks storage 960. Having multiple dependency queues allows multiple different tenants to concurrently request priority assignment/section-reordering without having to wait for each other's priority assignment to complete.

FIG. 10 illustrates a sequence of operations performed by some embodiments when a user/tenant initiates a firewall configuration management operation at its UI/API. The figure illustrates operations that take place among the user of tenant A, the network manager 105, the firewall configuration 150, the section priority assignment tasks 960, and the list of sections 950. The API/UI of tenant A allows the user to only make changes to the firewall configuration sections owned by tenant A.

During the first operation (labeled '1'), the network manager 105 operating the tenant A's API/UI 711 receives input/request from the tenant A user. This input specifies a firewall management operation, which can be adding a section, deleting a section, reading a section, updating a rule, adding a rule, removing a rule, etc. In the example, the specified operation is for adding a section "A5" at a priority position following the section "A3".

During the second operation (labeled '2'), the network manager 105 accesses the firewall configuration 150, e.g., to write, read, or modify the rules of a particular section. This operation does not affect the firewall operations of other tenants and can therefore immediate execute. In some embodiments, different tenants can concurrently access the storage of the firewall configuration 150. In some embodiments the operations '2' and '3' can occur simultaneously, i.e., the operation '3' does not have to wait for the operation '2' and vice versa.

During the third operation (labeled '3'), if requested firewall management operation requires reordering of sections, e.g., to add a new section, the network manager requests or schedules a task for assigning a priority number at the task storage 960. Conversely, if the requested firewall management operation does not require reordering of sections, the network manager would not schedule such a task.

If such a section-reordering task depends on the priority assignment of another section, then the task will be queued in the task storage 960 until the depended section has its priority number assigned. If the requested task does not have to wait for the priority number of another section to be assigned, then it can proceed directly to execution and access the list of sections 950 without being queued.

During the fourth operation (labeled '4'), the network manager 105 reports back to the user of tenant A through the API/UI 711, saying it is ready to accept the next firewall management operation from tenant A. In some embodiments, the network manager 105 is ready to accept the next firewall management operation even though the priority assignment task scheduled by operation '3' has yet to be completed (or in fact still sits in a queue). In other words, the priority assignment task is operating in the background and is invisible to the user at the API/UI 711.

During the fifth operation (labeled '5'), the scheduled task for adding the section "A5" after the section "A3" is actually performed. Since the scheduled task "add A5 after A3" depend on the priority assignment of A3, it would wait in the task storage 960 unless or until the section A3 is assigned a priority number. Once it executes, the priority assignment task assigns a priority number to the section "A5" in order for it be right after the section "A3". However, since the priority number of the section "A3" is "150" and the priority number of the section "A4" is "151", the priority assignment task changes the priority number of the section A4 from "151" to "170" in order to make room for the section "A5" to be after the section A4. The task then assigns the priority number "160" to the section "A5", which allows the section "A5" to be positioned after "A3" but before "A4". Again, all this takes place in the background while the tenant A user is free to specify another firewall configuration management operation at the UI/API 711.

As mentioned, multiple concurrent processes/activities can make modifications to the list of sections 950. As illustrated, during operation '5', another scheduled task by tenant C is concurrently adding a section "C4" after the section "C2". The new section "C4" is assigned a priority number "360" from the gap between the number "350" of "C2" and "370" of C4". This task is free to take place concurrently with the operation to add section "A5" since they do not affect with each other. The sparseness of the priority number allocation ensure there is another gap/slack between numbers assigned to different tenants such that the priority assignment by one tenant is unlikely to affect the priority assignment by another tenant.

Figure 11:
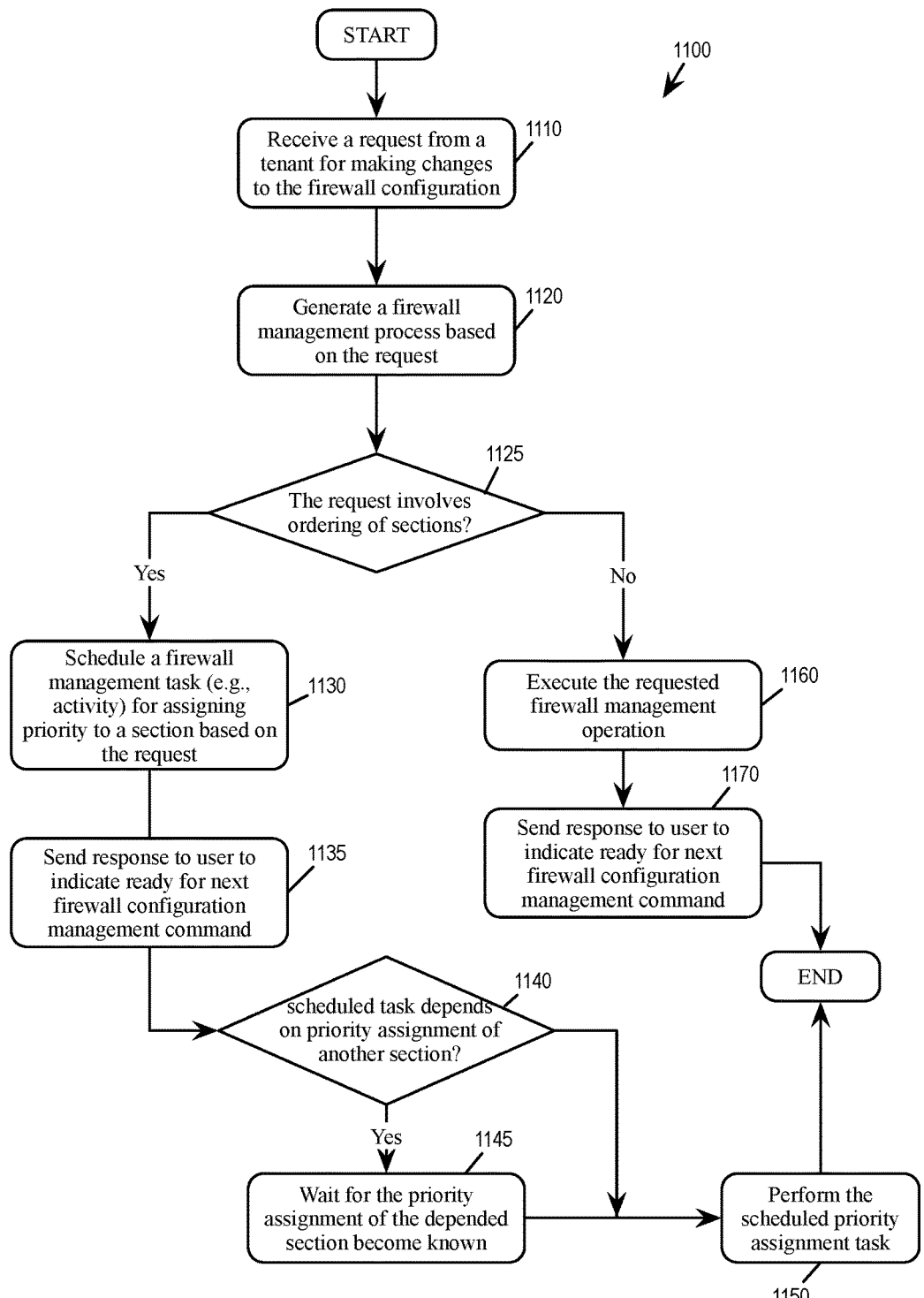
FIG. 11 conceptually illustrates a process implementing a request to update the firewall configuration of a software defined data center.

For some embodiments, FIG. 11 conceptually illustrates a process 1100 implementing a request to update the firewall configuration of a software defined data center. Some embodiments perform the process at the network manager (e.g., 105) of the data center, which controls the firewall configuration.

The process starts when it receives (at 1110) a request from a tenant for making changes to the firewall configuration of the data center. In some embodiments, a tenant uses the user interface element (UI, API, etc.) provided by the network manager to generate this request. In some embodiments, the network manager provides the user interface element to a tenant through a tenant access platform that supports multiple requests by multiple tenants at the same time.

The process then generates (at 1120) a firewall management process based on the request. It is important to emphasize that the process can handle multiple request from multiple tenants at the same time in some embodiments.

This is in order to allow each tenant to access and control its own firewall rules in the firewall configuration.

Next, the process determines (at 1125) whether the request involves ordering of sections, i.e., requires access to the list of sections. For example, a firewall management process that seeks to add or delete a section in the firewall configuration is a process that requires access to the list of sections. Some embodiments allow a "Get" request that retrieves the content of the list of sections. Such requests are also requests to access the list of sections. On the other hand, requests for changes (adding, editing, deleting) to the rules within a section result in firewall management processes that do not need to access the list of sections. If the firewall management request requires access of the list of sections, the process proceeds to 1130. If the firewall management request does not require access to the list of sections, the process proceeds to 1160.

At 1130, the process schedules a firewall management task for assigning priority to a section based on the request. The process then sends (at 1135) a response to the user to indicate that it is ready to accept the next firewall configuration management. The process then proceeds to 1140 to perform further operations as background tasks that are transparent to the user.

At 1140, the process determines whether the priority assignment of the requested section depends on the priority assignment of another section. For example the task "add a section A5 after the section A3" depends on the priority assignment of A3, while the task "delete section A2" does not depend on the priority assignment of any other section. If there is such a dependency, the process proceeds to 1145. Otherwise the process proceeds to 1150.

At 1145, the process waits for the priority assignment of the depended section to become known. If the priority assignment of the depended section is already known, e.g., if the depended section is a section already in the firewall configuration with an already assigned priority number, the process proceeds to 1150. On the other hand, if the priority assignment of the depended section is still unknown or not yet recorded in the list of sections, e.g., if the depended section whose priority assignment is waiting to be assigned by a previously scheduled task that has yet to be executed, then the process keeps on waiting until the previously scheduled task executes and assigns a priority number to the depended section. The process then proceeds to 1150.

At 1150, the process executes the scheduled priority assignment task and assigns the priority to the added section by performing the necessary edits to the list of sections. Again, multiple priority assignment tasks may make edits to the list of sections as long as their priority number assignment operations do not interfere with each other (such as the task to add section to add A5 and the operation to add C4 as illustrated in FIG. 10). The process 1100 then ends.

At 1160, the process executes the firewall management operation. At this point of the process 1100, the process has determined that the requested firewall wall management operation does not involve modifying the ordering of sections, e.g., the operation is for updating the rules of a section. The process therefore executes the operation without waiting for any other firewall management operations. The process then sends (at 1170) a response to the user to indicate that it is ready to receive the next firewall configuration management command. The process 1100 then ends.

The list of sections 950 is a data structure that is shared by the different tenants and can be edited by different tenants. Some embodiments therefore provide mechanisms to ensure that these concurrent write operations do not affect each other by e.g., having different scheduled priority assignment tasks assigning the same priority number to different sections, or having different priority numbers assigned to a same section. Some embodiments rely on locking or queuing mechanisms to ensure that only one task or activity is allowed to make changes to the list of sections at one time. Some embodiments, on the other hand, rely on the sparseness of the priority number allocation to ensure that concurrent priority assignment operations by different tenant do not interfere with each other.

However, each tenant is free to add and remove sections at whatever position or sequence that suits its purpose, which may cause the assignment/allocation of priority numbers to no longer be sparse, i.e., adjacent sections are assigned consecutive priority numbers as to leave no gap for subsequently insertion of sections. In order to make room for the subsequently added section, the priority number(s) assigned to existing sections in the firewall configuration would have to be reassigned, or rebalanced. As illustrated in the example of FIG. 10 above, adjacent sections A3 and A4 are assigned consecutive priority numbers ("150" and "151") so that a subsequent insertion of section A5 between A3 and A4 requires the priority number of either section A3 or section A4 be changed in order to make room for the section A5. Since such reassignment is time consuming and may cause multiple concurrent priority assignment tasks to interfere with each other (especially when the priority numbers of many sections have to be reassigned in order to create the requisite gaps in priority number space), some embodiments provide mechanisms for maintaining the sparseness of the priority number assignment and hence maximizes the probability that multiple priority assignment tasks can take place concurrently. Section II below discusses various methods for maintaining the sparseness of priority number allocation for some embodiments of the invention.

II. Fast Ordering of Rules and Sections

As mentioned, in order to add a section to a firewall configuration, some embodiment schedules a priority assignment task that edits the list of sections in order to assign priority numbers. Such assignment of priority is for the purpose of maintaining the ordering between the sections. However, maintaining the order of sections in the firewall configuration is not trivial when a tenant is free to add and delete sections at whatever position desired by the tenant. The same problem applies to maintaining order between rules within a section, since the rules within a section are also ordered such that the rules are examined according to a specified order. Some embodiments accomplish the ordering of sections and rules by treating the maintenance of ordering as a list-labeling and/or order maintenance problems.

FIGS. 12-16 below describes various techniques for assigning priorities to the sections of the firewall configuration as well as for assigning priorities to the rules of a firewall section. However, for purpose of avoiding duplicative description, FIGS. 12-16 illustrates the assignment of priorities to sections of a firewall configuration rather than the assignment of priority to rules to rules of a firewall configuration section. However, one of ordinary skill would understand that the techniques for maintaining the ordering of sections apply equally well to maintaining the ordering of rules within a section. As mentioned, some embodiments assign each section a priority number (which is also referred to as a key) according to the ordered position of the section in the firewall configuration, and the sections are ordered according to their relative priorities based on the assigned priority numbers. Likewise, each rule of a section is assigned a priority number according to its ordered position in the section, and the rules of the section are ordered according to their relative priority based on the assigned priority numbers.

Figure 12:
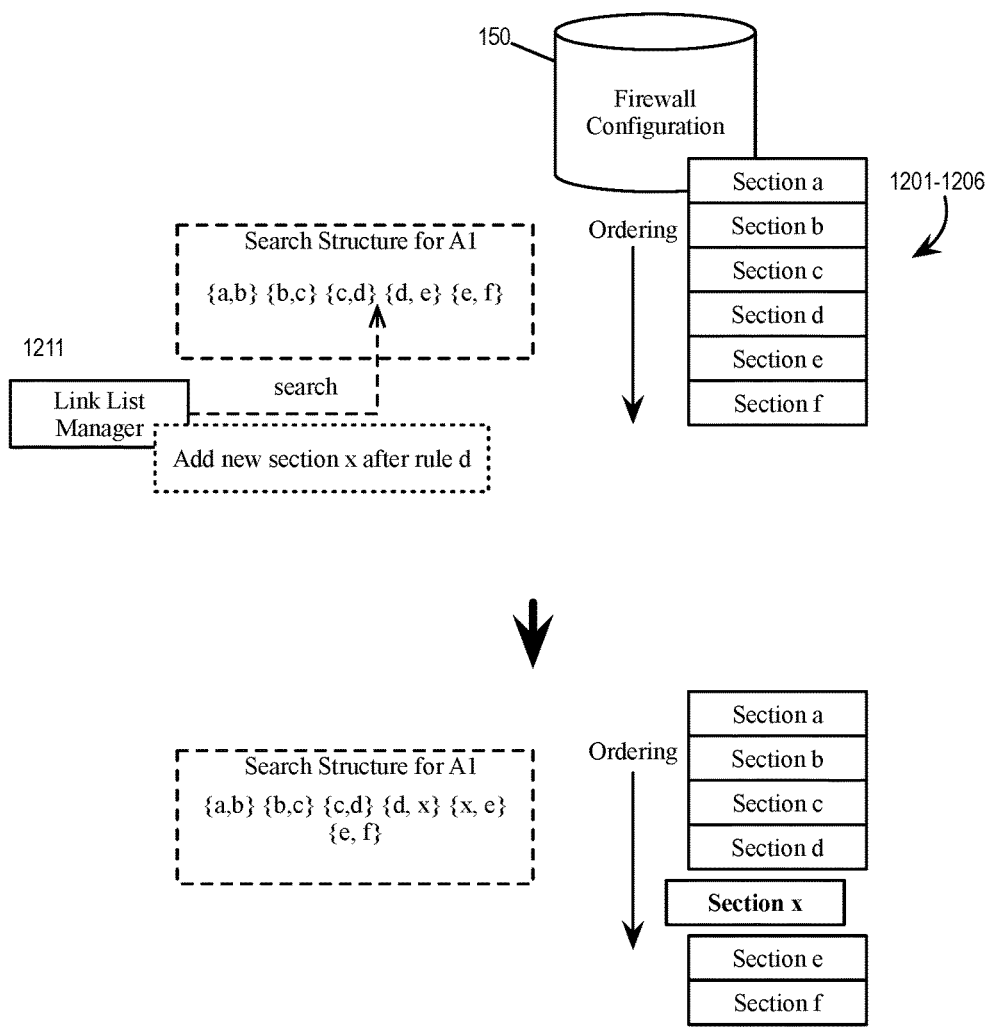
FIG. 12 conceptually illustrates a section of rules that maintains ordering by organizing the rules as a sequence of linked pairs.

Some embodiments maintain the ordering of sections in the firewall configuration by organizing the sections as a linked list. In some embodiments, this entails implementing a search data structure that stores the list of sections as a linked list, e.g., a sequence of linked pairs. FIG. 12 conceptually illustrates the firewall configuration 150 maintaining ordering of sections by organizing the sections as a sequence of linked pairs.

As illustrated, the firewall configuration 150 has several sections 1201-1206 ('a', 'b', 'c', 'd', 'e', 'f') that are prioritized in that order. The ordering of these sections is maintained by a search structure that organizes the sections as a linked list, specifically a sequence of linked pairs {a,b} {b,c} {c,d} {d,e} {e,f}.

The figure also illustrates an example section insertion operation that is adding a section 'x' after the section 'd'. The operation uses a link list manager 1211 to traverse the linked pairs from the first pair {a,b} until it reaches a pair with d. The link list manager 1211 then inserts the new section 'x' into the linked list by adding a new link {d,x} and by changing the link {d,e} to {x,e}. The sequence of linked pair then becomes {a,b} {b,c} {c,d} {d,x} {x,e} {e,f}. These link management operations allow the sections of firewall configuration 150 to be in the order as intended by the tenant or the administrator following the section insertion operation. To insert a section into such an ordered list is a computation that requires time in the order of N, N being the number of section in a firewall configuration of the data center.

In some embodiments, the ordering of sections in the firewall configuration is managed by using a binary search tree. The use of the binary search tree ensure that the addition or deletion of a section or a rule can be accomplished within a time period that is in the order of log(N), N being the number of sections. In some embodiments, the binary search tree is a complete binary search tree such that every possible priority number (both assigned and unassigned) has a unique corresponding node in the tree. In some embodiments, each node includes an indication of whether the priority number is assigned and which section it is assigned to.

Figure 13:
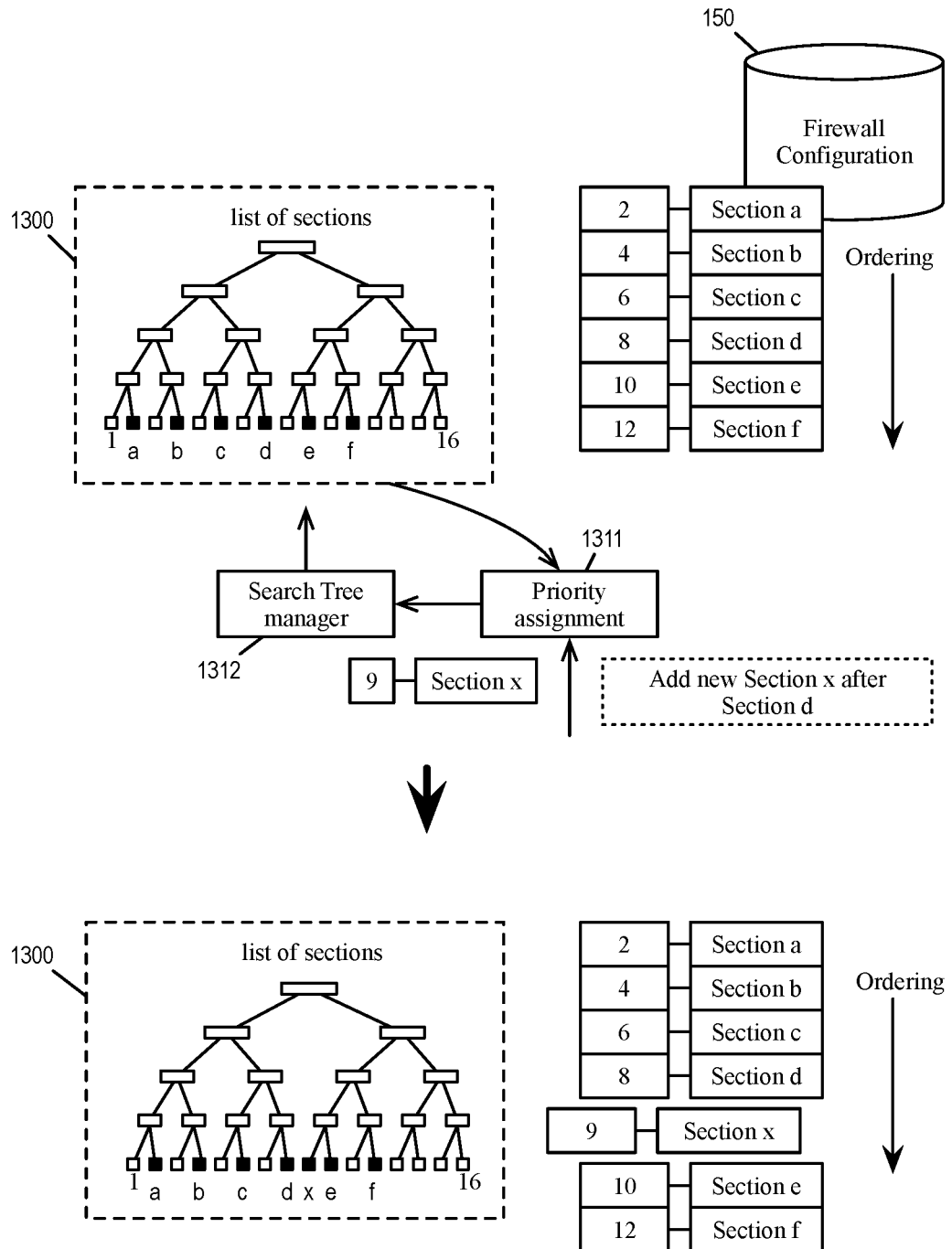
FIG. 13 illustrates a complete binary tree whose nodes corresponds to priority numbers assigned to rules in a firewall configuration section.

FIG. 13 illustrates a complete binary tree 1300 whose nodes correspond to priority numbers assigned to sections in a firewall configuration. As illustrated, the sections of the section 1201 'a', 'b', 'c', 'd', 'e', 'f' are correspondingly assigned priority numbers 2, 4, 6, 8, 10, and 12. A search tree manager 1312 uses these priority numbers to create the complete binary search tree 1300, where each occupied node corresponds to an assigned priority number while each empty node corresponds to an unassigned priority number. Since this is a binary search tree, the traversal to any particular node in the tree is in the order of log(N), N being the number of sections in the section.

The figure also illustrates an example section insertion operation that is adding a section 'x' after the section 'd'. In order to insert the new section 'x' as a node in the binary search tree, a priority assignment operation 1311 traverses the binary search tree to identify an available (i.e., unassigned) priority number that would correctly reflect the ordered position of the new section x, namely after section 'd' but before section 'e'. Since the section 'd' is assigned priority number 8 and the section 'e' is assigned priority number 10 and the priority number 9 is available, the firewall management process assigns the priority number 9 to the new section 'x'. The search tree manager operation 1312 then associates the node for priority number 9 with the section 'x'. In some embodiments, the priority assignment operation 1311 and the search tree manager 1312 are both operations performed by a firewall management process.

In the example of FIG. 13, the priority assignment operation 1311 is able to assign a priority number 9 that reflects the order position of the new section 'x' in the section because there is a gap in numbering (i.e., empty node or nodes) between the section immediately before (i.e., section 'd' with priority number 8) and the section immediately after (i.e., section 'e' with priority number 10). If there was no such gap, the firewall management process will have to perform an operation that reassigns priority number to at least some of the sections in order to make room for the new section at its intended priority position. This can be computationally quite expensive. To avoid this, the priority assignment operation 1311 in some embodiments performs several additional optimizations regarding the assignment of priority numbers when inserting a section into the firewall configuration. In some embodiments, some of these optimization techniques ensures that the priority numbers assigned to the different sections be sparsely allocated, which as mention by reference to FIG. 9 above, allows priority numbers to be assigned quickly and minimizes the need for reassigning the priority number of other sections.

Figure 14:
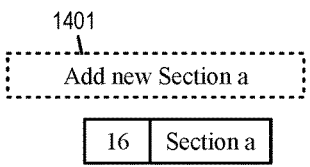
FIG. 14 illustrates a priority assignment scheme that seeks to leave as room as possible between adjacent priority numbers.
Figure 14:
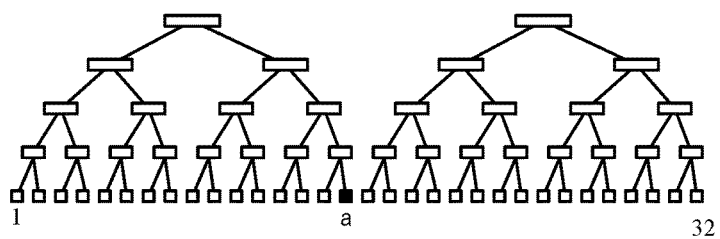
Figure 14:
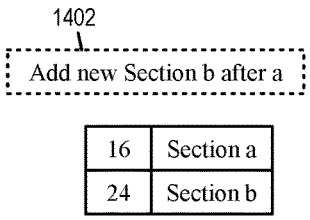
Figure 14:
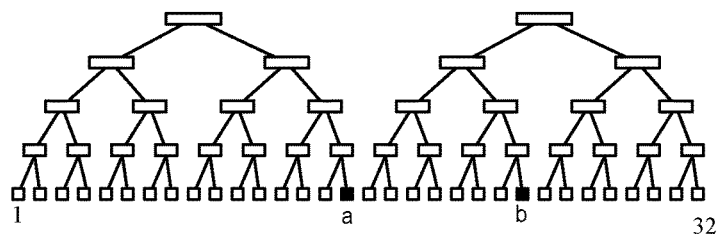
Figure 14:
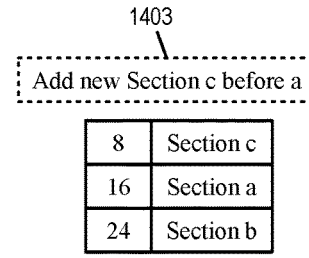
Figure 14:
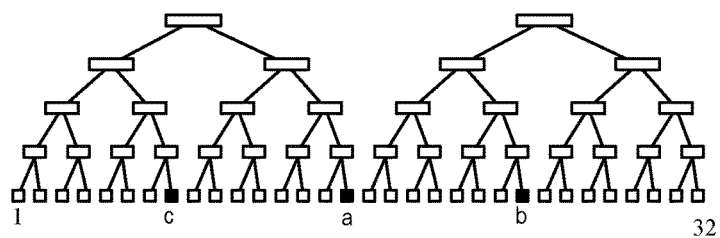
Figure 14:
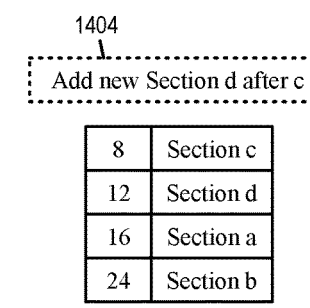
Figure 14:
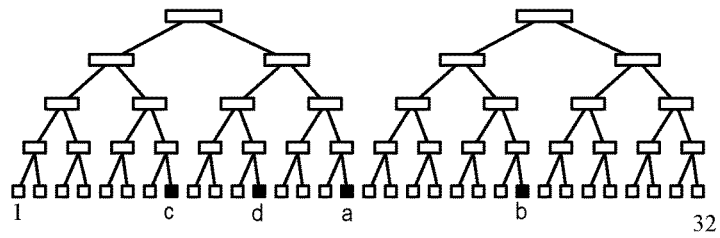
Figure 14:
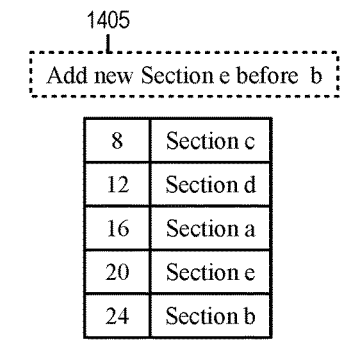
Figure 14:
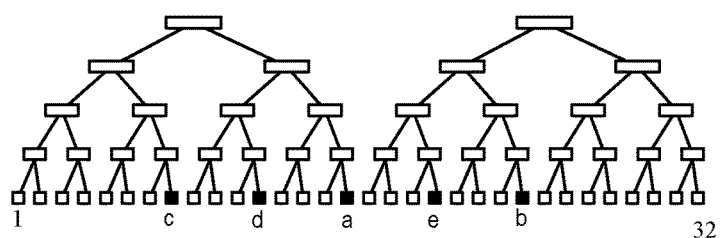

Some embodiments, when assigning priority numbers to new incoming sections, use a greedy scheme would always leave as room as possible, e.g., by assigning a priority number that is right in the middle of the available space between the priority number immediately before and the priority number immediately after. FIG. 14 illustrates a priority assignment scheme that seeks to leave as much room as possible between adjacent priority numbers.

FIG. 14 illustrates a series of section insertions 1401-1406 for inserting sections 'a' through 'e', respectively. Each inserted section is assigned a priority number that leaves the most room to the section immediately before and to the section immediately after. (In this example the range of priority number is from 1 to 32.) For example, the tenant (at the section insertion 1406) specifies that the section 'e' shall be inserted at a position before 'b' (and thus after 'a') in the firewall configuration section. Since the section 'b' is assigned priority number 24 and the section 'a' is assigned priority number 16, the priority assignment operation assigns the priority number 20 to the section 'e'. Consequently, the sections 'a', 'b', 'c', 'd', 'e' are assigned priority numbers 16, 24, 8, 12, and 20, respectively. The figure also shows the complete binary tree 1400 that is constructed based on the assigned priority numbers as the sections are being inserted.

The example of FIG. 14 shows a sequence of insertions that is fairly random balanced. The priority assignment operation is therefore able to allocate a priority number for each of the newly inserted sections. However, it is also likely that the tenant inserts the sections in the same order as the sections are to be positions in the firewall configuration section. This type of sequence is highly unbalanced because each newly inserted section is always to the one side of the previously inserted sections. If the priority assignment operation were to always assign a priority number that is right in the middle of the available space, a highly unbalanced section insertion sequence would leaves little or no room for subsequent insertions. Some embodiments record the sequence of section insertions and assign priority numbers based on the recorded sequence, i.e., by detecting the pattern of the section insertions. The assignment priority number for each section is chosen to minimize the possibility of running out of priority numbers to assign due to unbalanced sequence, i.e., to minimize collision of priority numbers between newly inserted section and sections already in the firewall configuration.

Figure 15:
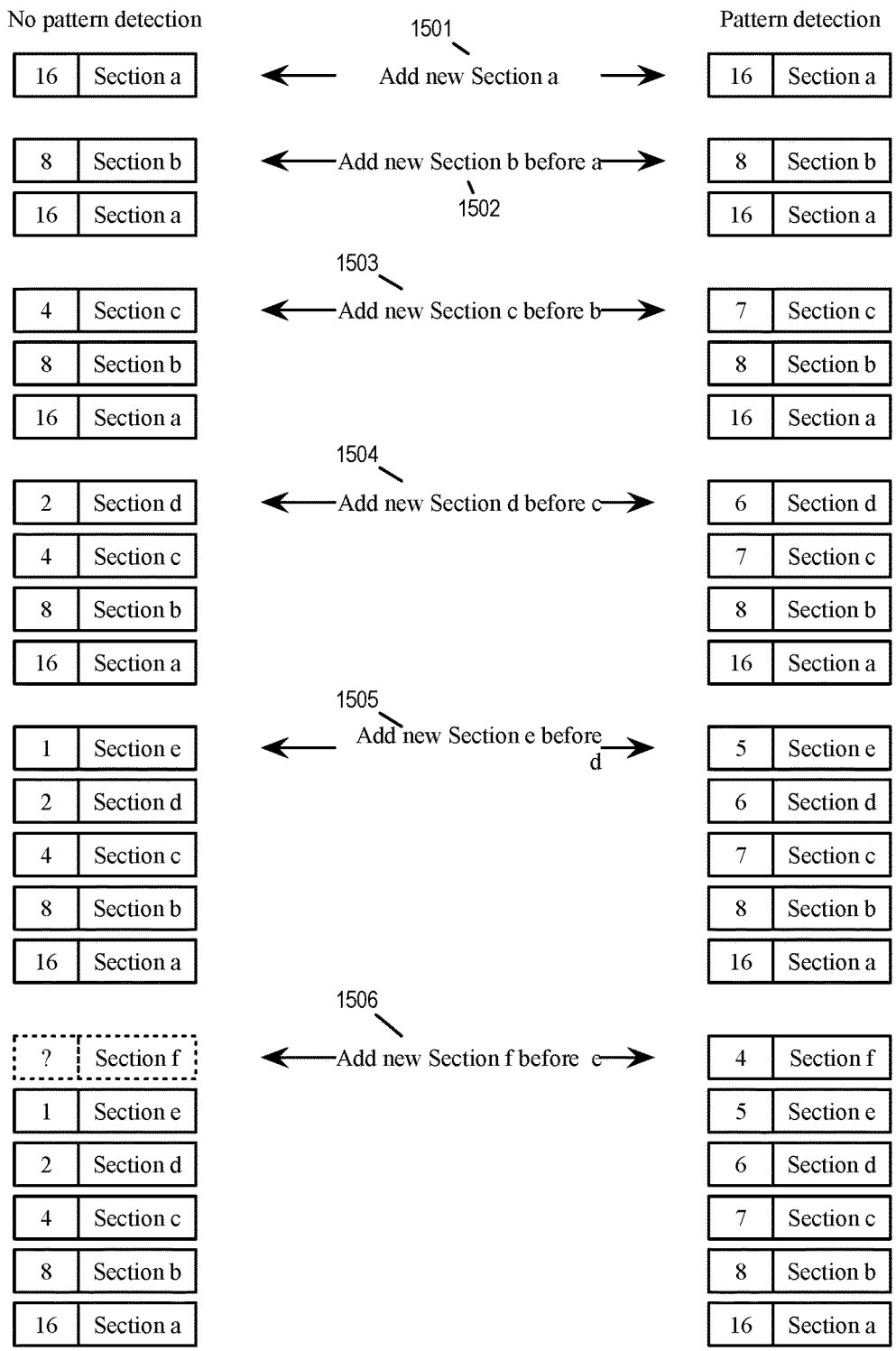
FIG. 15 shows assignment of priority numbers when the sequence of rule insertion is unbalanced.

FIG. 15 shows assignment of priority numbers when the sequence of section insertion is unbalanced. The figure shows an example of such unbalanced sequence of section insertions 1501-1506. As illustrated, sections 'a' through 'f' are inserted in sequence, and each section is to be before the previously inserted section. When the priority assignment is simply to select the middle number in the available space, the assignment of priorities would run out of available priority numbers to assign. In this example, after the insertion of the section 'e', there is no room for inserting the section 'f' (assuming there can be no priority number less than 1).

For the same unbalanced sequence of section insertions, FIG. 15 also shows an example priority assignment scheme that assign priority number based on detection of insertion patterns. In this example, the priority assignment operation detected that the sequence of section insertion is for inserting a continuous set of sections, i.e., every section inserted is before the last inserted section. The priority assignment operation therefore stops seeking to leave as much room as possible between adjacent priority numbers. Instead, the priority assignment simply provides consecutive numbers as priority numbers (the sections 'c', 'd', 'e', and 'f' are assigned consecutive as priority numbers 7, 6, 5, 6, respectively), leaving room for additional sections beyond section 'f'.

In some embodiments, a firewall management process perform periodic rebalancing of the assigned priority numbers, i.e., to re-label at least some of the sections (or rules) with different priority numbers in order to create more room for subsequent section insertions. Such rebalancing also helps to ensure that the assignment of priority numbers to the different sections remain sparsely allocated. Some embodiments perform rebalancing when it is not able to assign a priority number to the newest section being inserted. Some embodiments perform rebalancing of the assigned priority number by re-distributing the keys uniformly (i.e., by reassigning the priority numbers to the sections in a uniformly spaced fashion while maintaining the original ordering). Some embodiments perform rebalancing by assigning more space (i.e., allocating more unassigned priority numbers) around the key assigned to the section whose insertion caused the rebalancing.

Some embodiments perform periodic rebalancing of the assigned priority numbers, i.e., to re-label at least some of the sections (or rules) with different priority numbers in order to create more room for subsequent section insertions. Such rebalancing also helps to ensure that the assignment of priority numbers to the different sections remain sparsely allocated. A firewall management process in some embodiments performs rebalancing when it is not able to assign a priority number to the newest section being inserted.

Some embodiments perform rebalancing of the assigned priority number by re-distributing the keys uniformly (i.e., by reassigning the priority numbers to the sections in a uniformly spaced fashion while maintaining the original ordering). Some embodiments perform rebalancing by assigning more space (i.e., allocating more unassigned priority numbers) around the key assigned to the section whose insertion caused the rebalancing.

Figure 16:
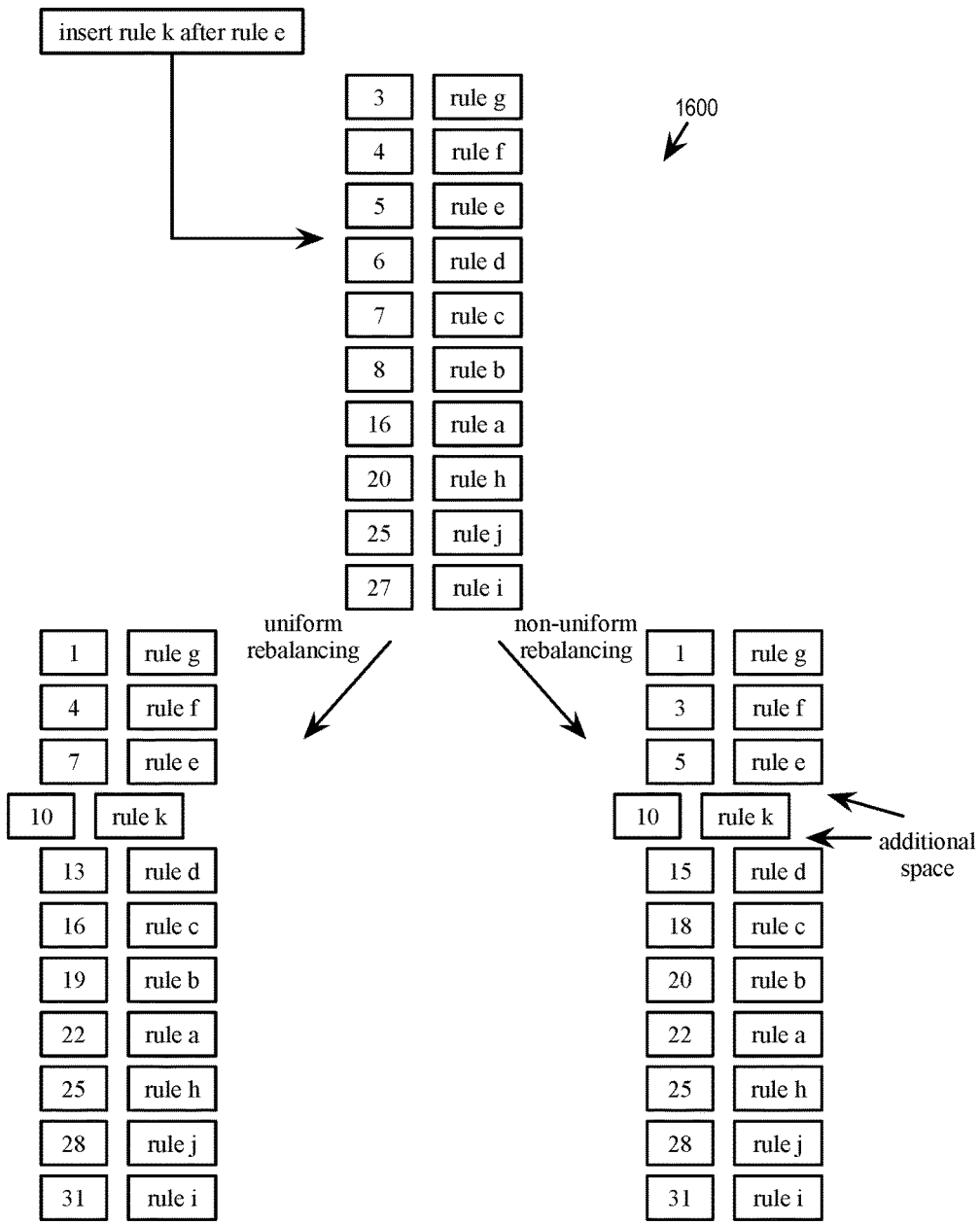
FIG. 16 illustrates the rebalancing of the priority number assignment.

FIG. 16 illustrates the rebalancing of the priority number assignment. The figure illustrates a firewall configuration section 1600 that already has sections 'a' through 'j'. The sections are each assigned a priority number when they were inserted into the firewall configuration section. As illustrated, the tenant has requested to insert a section 'k' to be after section 'e', but there is no space for the insertion after section 'e', since section 'e' is assigned priority 5, and section is already assigned priority 6, so there is no room for insertion of section 'k' after section 'e'.

Consequently, the firewall management process performs a rebalancing of the priority numbers/keys of the section in order to create space for inserting the new section at its specified position. The rebalancing assigns each section a new priority number, albeit still maintaining in the same order as before. The rebalancing operation created additional spacing around sections 'e' and (and elsewhere), and the new section 'k' can now be assigned a priority number between sections 'e' and 'd'.

The figure illustrates two types of rebalancing, uniform rebalancing and non-uniform rebalancing. In uniform rebalancing, and the reassigned keys are even spaced. Uniform rebalancing is useful when the next section can be inserted anywhere with equal probability. On the other hand, non-uniform rebalancing assumes the next section being inserted is more likely to be in the vicinity of the newly inserted section (the section whose insertion necessitated the rebalancing), and additional sections are likely to be inserted around the same region of the priority number space. Consequently, non-uniform rebalancing assigns more space around the newly inserted section (i.e., section 'k') and leave less space elsewhere. In this example, the section 'k' is assigned priority number 10, and the two nearest sections are each 5 away (section 'e' is reassigned priority 5 and section is reassigned priority 15); else where the spacing between adjacent sections is no more than 3. Some embodiments assign up to ¼ of the entire range of possible priority numbers as spacing around the key assigned to the section whose insertion necessitated the rebalancing. (The range of possible priority numbers in this example is 1 through 32, so ¼ of the entire range is 8).

Figure 17:
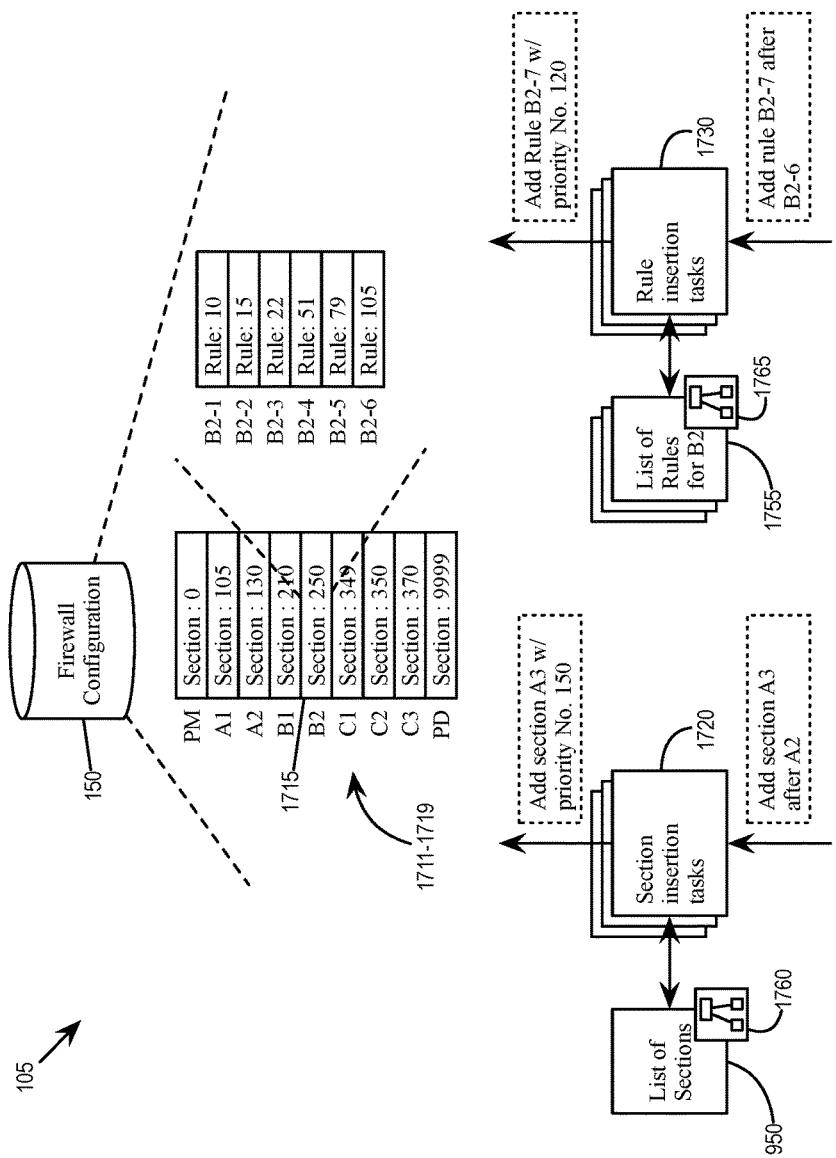
FIG. 17 illustrates a network manager that performs priority assignments for newly added rules as well as for newly added section.

As mentioned, the techniques for assigning priority numbers to sections of a firewall configuration described by FIGS. 12-16 above apply equally for assigning priority numbers to rules of any given section. FIG. 17 illustrates a network manager that performs priority assignments for newly added rules as well as for newly added section.

As illustrated, the firewall configuration 150 includes sections 1711-1719, and the network manager 105 maintains the list of sections 950 for maintaining the ordering of the sections in the firewall configuration 150. The network manager 105 also maintains a list of rules for each section in the firewall configuration, such as the list of rules 1755 for the section 1715 ("B2"). Different firewall management tasks from different tenants are making changes to the firewall configuration, including tasks 1720 for adding sections and tasks 1730 for adding rules to particular sections.

Each insertion of a new section uses the list of sections 950 to assign a priority number to the newly added section. Each insertion of a new rule to a section uses the list of rules of that section to assign a priority number to the new rule (e.g., using the list of rules 1755 for the section B2 to assign priority to a newly added rule B2-7 into the section B2).

The network manager 105 performs rebalancing of priority numbers allocated to the sections of the firewall configuration by using a binary search tree 1760 associated with list of sections 950. The network manager also performs rebalancing of priority numbers allocated to the rules of the each section by using a binary search tree associated with the list of rules of that section (e.g., the binary search tree 1765 of the list of sections 1755).

Figure 18:
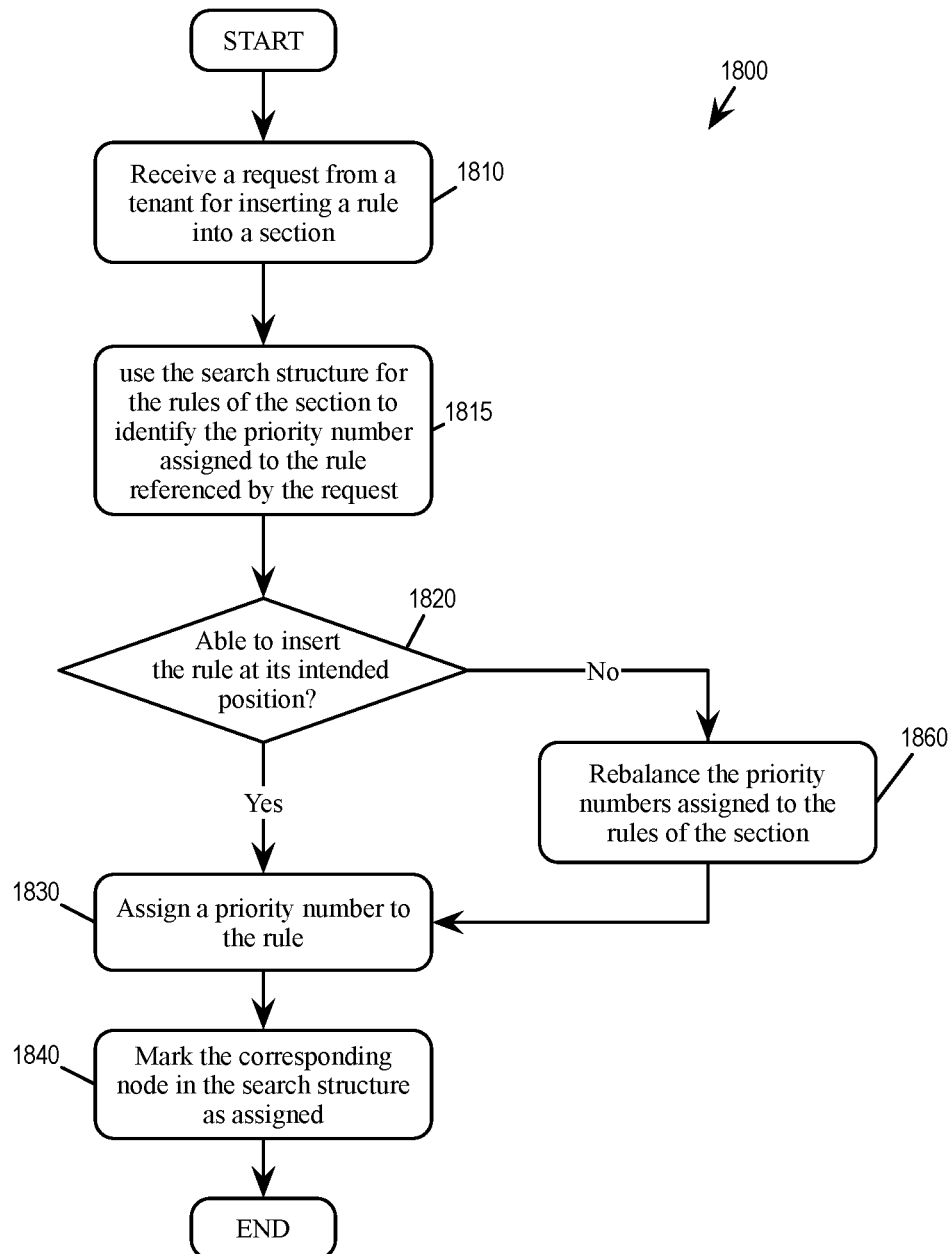
FIG. 18 conceptually illustrates a process for inserting a rule in into a section while maintaining the ordering of the rules within the section.

For some embodiments, FIG. 18 conceptually illustrates a process 1800 for inserting a rule in into a section while maintaining the ordering of the rules within the section. In some embodiments, a network manager performs the process 1800 as part of a firewall management process. In some embodiments, the process 1800 is performed as an activity operating in the background until it completes the priority number assignment task.

The process 1800 starts when it receives (1810) a request from a tenant to insert a rule in a section. Such a request in some embodiments specifies the rule's intended position relative to other rules in the section, e.g., by specifying that the rule is to be after a particular rule, unless the rule is the first rule inserted into the section.

The process then identifies (at 1815) the priority number of the referenced rule. In some embodiments, each rule in the section has a unique ID (e.g., universal unique identifier, or UUID) that allows the rule to be quickly identified and mapped to its corresponding priority number. This priority number will be used to identify the priority numbers that already been assigned around the intended position.

The process then determines (at 1820) whether it is able to insert the rule at its intended position around the identified priority number of the referenced rule. In some embodiments, the process uses the priority number binary search tree associated with the list of rules of the section to identify an available (i.e., unassigned) priority number that can be assigned to accurately reflect the intended position of the new rule. If there is space for inserting the rule, i.e., there is an unassigned priority number that can correctly reflect the position of the rule being inserted, the process proceeds to 1830. If there is no space for inserting the rule at its intended position (i.e., collision), the process proceeds to 1860.

At 1860, the process performs rebalancing of the priority numbers assigned the rules of the section (since the process is not able to assign a priority number to the rule being inserted). Some embodiments balance the priority numbers by reassigning the new priority numbers to all rules with uniform spacing. Some embodiments rebalance the priority numbers by reassigning new priority numbers that leave more spacing around the newly inserted rule (i.e., the rule that necessitated the rebalancing) than elsewhere in the range of priority numbers. The process 1800 then proceed to 1830 to assign a priority number to the newly inserted rule.

At 1830, the process assigns a priority number to the rule by selecting a number that is between the adjacent rules. Some embodiments assign the number in the middle of the gap between the two adjacent rules as the priority number for the rule. Some embodiments select a number based a detected pattern. The selection of a priority number is discussed above by reference to FIG. 15. The process then marks (at 1840) a node in binary search tree that corresponds to the newly assigned priority number as assigned to the newly added rule. The process 1800 then ends.

Figure 19:
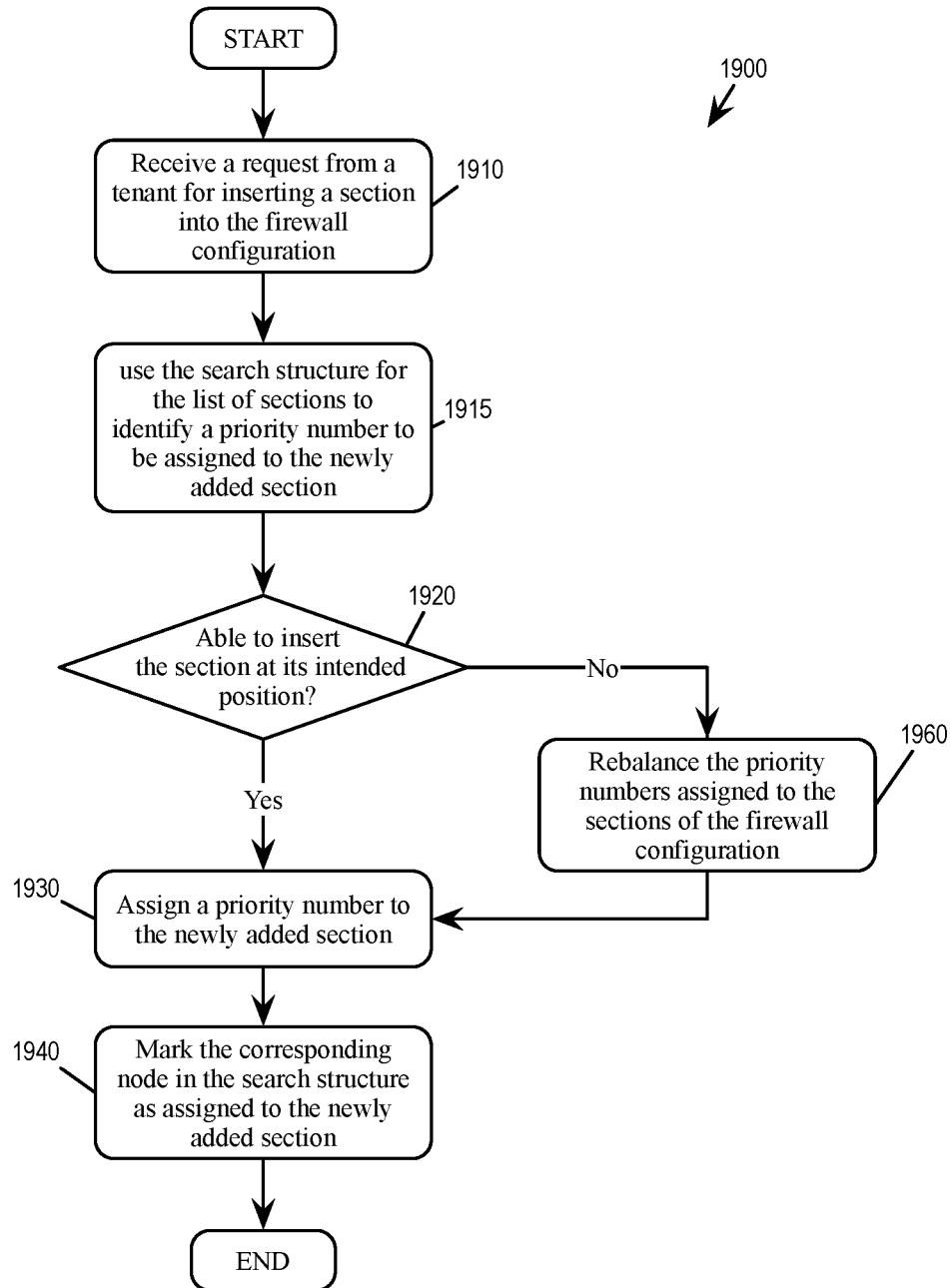
FIG. 19 conceptually illustrates a process for inserting a section into a firewall configuration while maintaining the ordering of the sections within the firewall configuration.

For some embodiments, FIG. 19 conceptually illustrates a process 1900 for inserting a section into a firewall configuration while maintaining the ordering of the sections within the firewall configuration. In some embodiments, a network manager performs the process 1900 as part of a firewall management process. In some embodiments, the process 1900 is performed as an activity operating in the background until it completes the priority number assignment task.

The process 1900 starts when it receives (1910) a request from a tenant to insert a section in the firewall configuration. Such a request in some embodiments specifies the section's intended position relative to other sections in the firewall configuration, e.g., by specifying that the section is to be after a particular section, unless the section is the first section inserted into the section.

The process then identifies (at 1915) the priority number of the referenced section. In some embodiments, each section in the firewall configuration has a unique ID (e.g., universal unique identifier, or UUID) that allows the section to be quickly identified and mapped to its corresponding priority number. This priority number will be used to identify the priority numbers that already been assigned around the intended position.

The process then determines (at 1920) whether it is able to insert the section at its intended position around the identified priority number of the referenced section. In some embodiments, the process uses the priority number binary search tree associated with the list of sections such as 1300 to identify an available (i.e., unassigned) priority number that can be assigned to accurately reflect the intended position of the new section. If there is space for inserting the section, i.e., there is an unassigned priority number that can correctly reflect the position of the section being inserted, the process proceeds to 1930. If there is no space for inserting the section at its intended position (i.e., collision), the process proceeds to 1960.

At 1960, the process performs rebalancing of the priority numbers assigned to the sections of the firewall configuration (since the process is not able to assign a priority number to the section being inserted). Some embodiments balance the priority numbers by reassigning the new priority numbers to all sections with uniform spacing. Some embodiments rebalance the priority numbers by reassigning new priority numbers that leave more spacing around the newly inserted section (i.e., the section that necessitated the rebalancing) than elsewhere in the range of priority numbers. Some embodiments uses the binary search structure associated with the list of sections to identify a range to confine the rebalancing operation. The operation to identify a range for rebalancing priority numbers for sections will be described in further detail by reference to FIG. 20 below. The process 1900 then proceed to 1930 to assign a priority number to the newly inserted section.

At 1930, the process assigns a priority number to the section by selecting a number that is between the adjacent sections. Some embodiments assign the number in the middle of the gap between the two adjacent sections as the priority number for the section. Some embodiments select a number based a detected pattern of insertion. The selection of a priority number is discussed above by reference to FIG. 15. The process then marks (at 1940) a node in the binary search tree that corresponds to the newly assigned priority number as assigned to the newly inserted section. The process 1900 then ends.

As mentioned, some embodiments rely on sparseness of the priority allocation to maximize the possibility that different section insertion requests by different tenants may take place concurrently. In order to maintain or improve the sparseness of priority allocations, some embodiments perform rebalancing operations that re-label at least some of the sections (or rules) with different priority numbers. However, a rebalancing operation itself may interfere with some of the section insertion/priority assignment tasks, forcing some of the priority assignment tasks to wait for rebalancing operation to complete before proceeding. In order to minimize such waiting and to further maximize concurrency, some embodiments use the binary search tree to segment the priority number space into ranges and to confine rebalancing operation into a smallest range necessary in order to maximize the probability that a priority assignment task may proceed without having to wait for the rebalancing operation.

Figure 20:
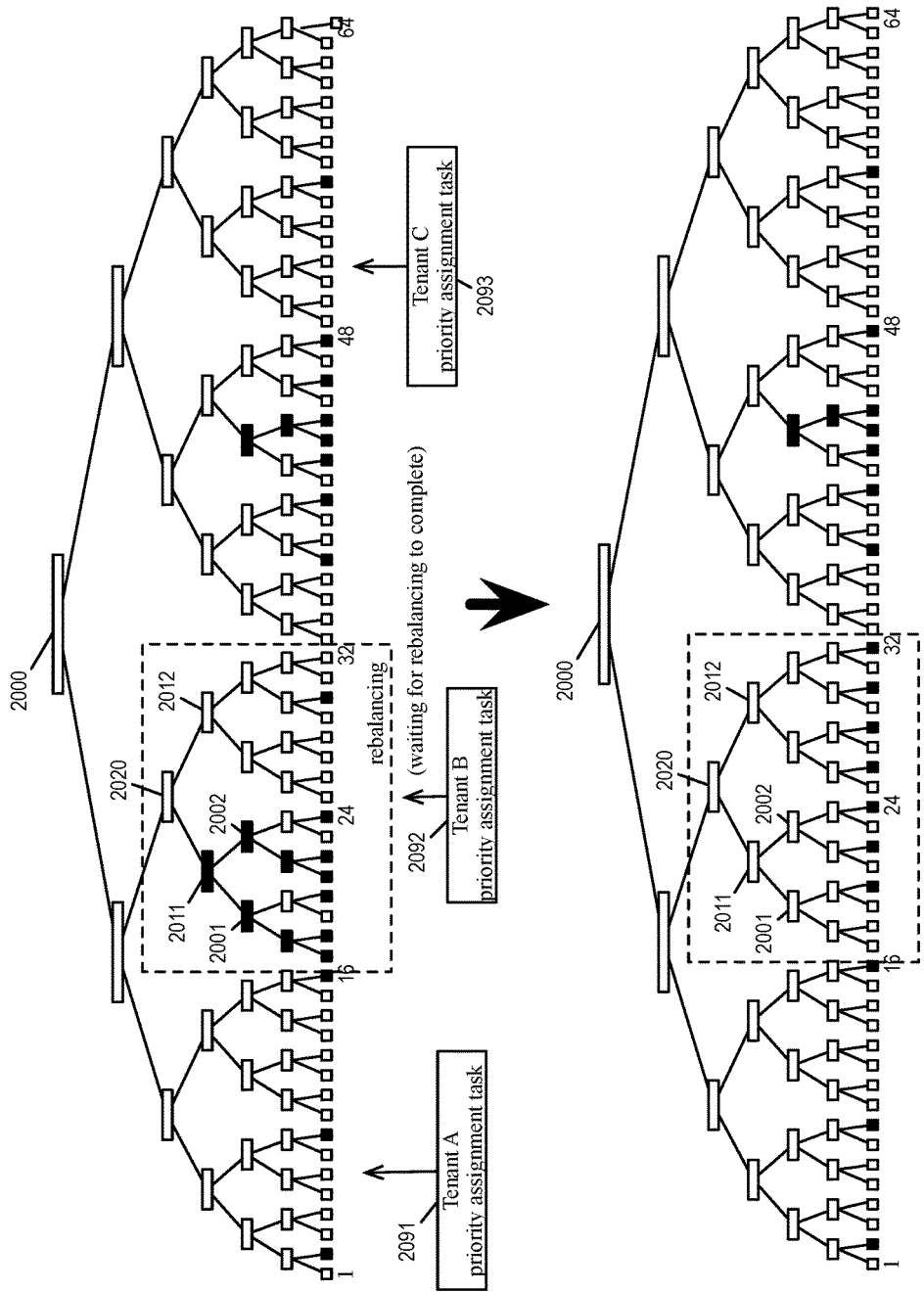
FIG. 20 illustrates using binary search tree to confine rebalancing operations in order to maximize concurrency.

FIG. 20 illustrates using binary search tree to confine rebalancing operations in order to maximize concurrency. The figure illustrates a binary search tree 2000 whose nodes corresponds to possible values of priority numbers that can be assigned to sections (1 through 64 in this example). Leaf nodes illustrated as filled correspond to priority numbers that have been assigned, while leaf nodes that are empty correspond to priority numbers that have not been assigned. Each of the non-leaf nodes represents a range of priority numbers that are encompassed by its child nodes.

A non-leaf node can be an overflowing node that represents a range of priority numbers that is overflowing. For example, the non-leaf node 2011 is considered an overflowing node, because it encompasses priority numbers (17 through 24) that are mostly already assigned. Subsequent priority assignment into this range/segment is likely to collide with existing priority number assignment. Likewise, non-leaf nodes 2001 and 2002 are both considered overflowing nodes, because they each encompass a range of priority numbers (17 through 20 and 21 through 24, respectively) are overflowing.

A non-leaf node can be a sparse node that represents a range of priority numbers that is sparsely populated. For example, the non-leaf node 2012 is a sparse node, because it encompasses priority numbers (25 through 32) that are mostly unassigned. Subsequent priority assignment into this range/segment would not result in collision. The node 2020 is the parent node of both the overflowing node 5811 and the sparse node 2012. It is also considered a sparse node. Though the distribution of assigned priority numbers is highly unbalanced in this range (17 through 24 is overflowing and 25 through 32 is sparse), the node 2020 includes enough unassigned priority numbers to become entirely sparse if it were rebalanced.

When performing rebalancing, some embodiments start from an overflowing node in the binary search tree and traverse up toward the root node until encountering a sparse node. This lowest sparse ancestor node represents the smallest range by which the rebalancing operation can be confined to and the rebalanced range of priority assignment will be completely sparsely allocated. In the example of FIG. 20, the network manager would start from an overflow node (e.g., the node 2001) and go up the tree until it reaches a sparse node (the node 2020).

In addition to classifying a node as sparse or overflow, some embodiments also characterize each node according to its "degree of sparseness". For example, a node that correspond to a range of possible priority numbers that is almost complete unassigned is considered "sparser" than a node that correspond to a range with slightly more than half of the possible priority numbers unassigned. In order to minimize the number of future rebalancing operations, some embodiments when identifying a range of rebalancing operation would traverse up the tree until it reaches a node that is "sufficiently sparse" (e.g., having more than a certain threshold percentage of unassigned priority numbers).

In some embodiments, the range (17-32) identified by this lowest sparse ancestor node (2020) is used as the range of the rebalancing operation, i.e., only sections whose priority numbers fall within this range would have their priority numbers rebalanced/re-labeled, while the priority numbers of other sections would remain unaffected. This allows priority assignment for sections outside of the rebalanced range to proceed without waiting for rebalancing operation (e.g., tenant A task 2091 and tenant C task 2093), though priority assignment tasks for sections with priority numbers within the rebalanced range have to wait for rebalancing operation to complete (e.g., tenant B task 2092).

As mentioned, each section has a list of rules that is organized by using a binary search tree specific to the section. In some embodiments, the leaf nodes of the binary search tree of the section corresponds the space of possible priority numbers that can be assigned to the rules of the section. Like its counterpart in the list of sections, the binary search tree of the list of rules of a section is also used to identify the smallest possible range for rebalancing. This is for the purpose of maximizing the likelihood that a tenant operation to insert a rule in the section can proceed without waiting for the rebalancing operation to complete.

III. Firewall Management Activities

An activity is a fault tolerant definition of a workflow to be executed in management plane. An activity consists of an internal state (or context) and a state machine that is defined in terms of phases and their interactions and is checkpointed after execution of each phase. In some embodiments, an activity is executed only on a single entity. In some embodiments, each scheduled activity remains active in the background until the task of assigning the priority to the section is complete. In some embodiments, an activity is instantiated with a given set of arguments that includes the unique identifier of the entity (e.g., a section of the firewall configuration, the list of sections of the firewall configuration, etc.) on which the activity will operate. The instantiated activity is then submitted to an activity executor service for execution.

In some embodiments, at least some of the processes that are concurrently managing the firewall configuration are implemented as activities. Such a firewall configuration managing activity is in some embodiments used for inserting a new section into the plurality of sections, deleting an existing section from the plurality of sections, or other types of firewall configuration management tasks that may result in changes in the ordering of the sections. In some embodiments, a firewall configuration management activity manages the ordering of sections in the firewall configuration by operating algorithms for solving list-labeling/order maintenance problems, e.g., by re-ordering the sections when it insert or remove a section in the firewall configuration, or by assigning priorities to firewall sections. Some embodiments use activities only for assigning priorities to firewall sections, but not for updating rules within firewall sections.

Figure 21:
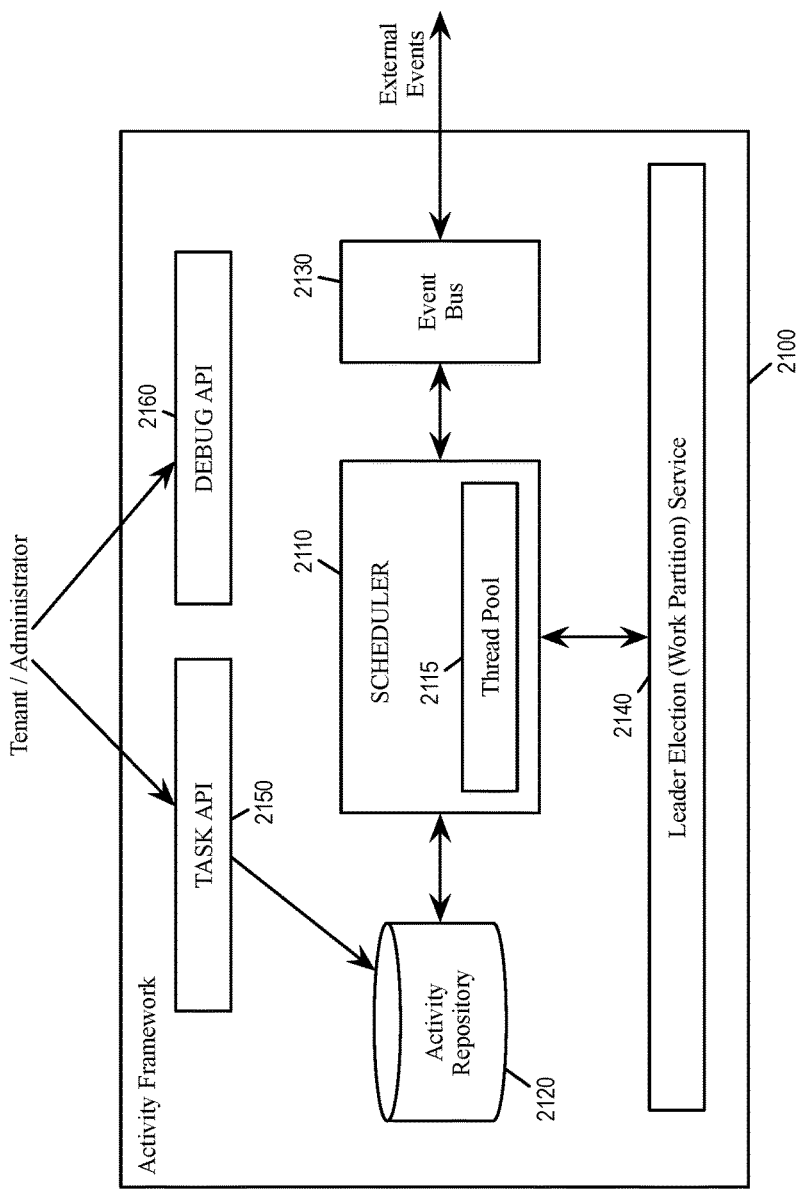
FIG. 21 illustrates various components of an activity framework.

For some embodiments, FIG. 21 illustrates various components of an activity framework 2100. As illustrated, the activity framework includes an activity scheduler 2110, an activity repository 2120, an event bus 2130, a sharding service 2140, a task API 2150, and a debug API 2160.

The activity scheduler 2110 is responsible for execution of activities. In some embodiments, the activity scheduler executes activities by using a local worker thread pool 2115. The Activity repository 2120 is for storing the activities submitted by tenants or by administrator of the software defined data center (e.g., firewall management processes). The stored activities in the repository are fetched and executed by the activity scheduler 2110. In some embodiments, the activity repository stores the submitted activities in a distributed data storage within the data center. The event bus 2130 is responsible for providing integration platform between the activity scheduler 2110 and events that are from external sources.

The sharding service (or work partition service) 2140 is responsible for determining the ownership of activity space between multiple messenger (e.g., Proton) nodes. Each messenger nodes handles a subset of the activities in the system. In some embodiments, upon change in the cluster membership (e.g., due to node shutdown/crash or network failure), this service is responsible for reassigning activities owned by the failed node to the other live nodes in the system. In some embodiments, the activity framework 2100 utilizes the sharding service so as to partition the entity space uniformly among the management cluster nodes such that for every entity in the system a single node is elected as the master. This master node is responsible to manage the lifecycle of all activities submitted against this entity. This enables the activity framework to provide synchronization for activity executions (e.g. exclusive activity) without requiring distributed synchronization.

The network manager of the software defined data center provides the task API 2160 and the debug API 2170 for receiving submissions of activities from the user (tenants or administrator). The task API 2150 supports asynchronous API execution using either UI/REST. The debug API is for enabling troubleshooting the activity framework at runtime.

Some embodiments launches an activity for managing a section of the firewall configuration when a tenant owning the section invokes an API at the network manager in order to access or update the section or the rules of the section. In some embodiments, the launched activity is placed in a queue with other activities that are managing the firewall configuration, where a queued activity is a background thread that is not executed immediately.

Figure 22:
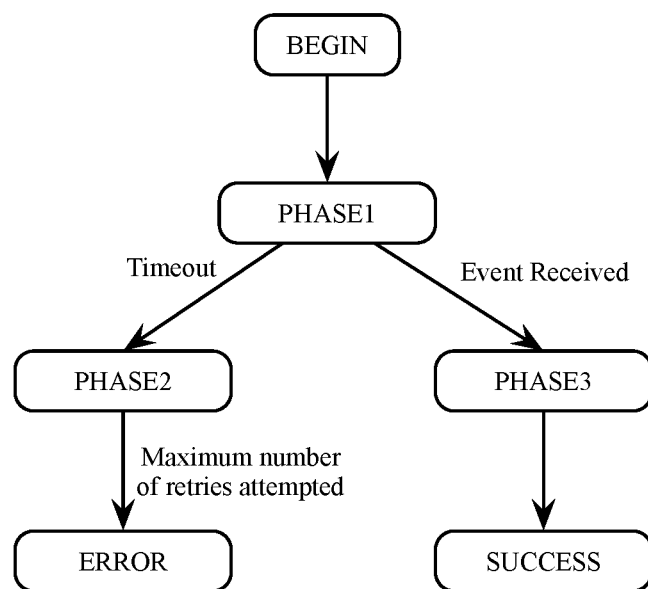
FIG. 22 conceptually illustrates an example state machine of an activity for some embodiments of the invention.

In some embodiments, a firewall configuration management activity maintains a state that reflects the different phases of its current access to its corresponding section of firewall rules. An activity consists of internal state (or context) and a state machine that is defined in terms of phases and their interactions. FIG. 22 conceptually illustrates an example state machine of an activity for some embodiments of the invention. As illustrated, the activity has several phases: BEGIN, PHASE1, PHASE2, PHASE3, ERROR, and SUCCESS. Once the activity is scheduled for execution, the activity starts in the BEGIN phase. Successful execution of each phase (PHASE1, PHASE2, etc.) returns a set of guidelines to the scheduler. The activity can then instruct the scheduler to execute the next phase (optionally based on certain condition). If the phase fails to execute successfully, the scheduler can perform specified number of retries for the same phase (which is configurable in some embodiments). After that specified number of retries, the activity would give up and move to the ERROR phase. The activity completes execution in either the SUCCESS or the FAILURE phase.

In some embodiments, the activity framework avoids executing long running blocking (or synchronous) computations during phases of an activity. This prevents some activities from hogging the entire worker thread pool 2115 (of the scheduler 2110) and starving the other queued up activities. The activity framework in some embodiments enforces this restriction by canceling a computation if it exceeds a configurable timeout (e.g., 5 minutes).

In order to allow longer computations, some embodiments of the activity framework provide a pluggable eventing framework so long running computations can be executed on a different thread pool or on an entirely separate subsystem. The activity in some of these embodiments informs the scheduler that its further execution depends on the acknowledgement of one or more events. The framework checkpoints the activity context and move it to a WAITING_FOR_EVENT status. The framework also keeps track of these events. Once all the required events are acknowledged, it resumes the execution of the activity. The framework also has a timeout detector component that periodically checks all suspended activities (owned by the current messenger node). If an activity with an unacknowledged event is found to have exceeded the specified timeout value, it resumes the activity in the phase configured to be executed in case of timeout (the default phase for this is the ERROR phase).

In some embodiments, the activity is check-pointed after each phase. In some embodiments, each activity is check-pointed in order to allow recovery of the activity from a saved check-point. In some embodiments, each activity reports to a controller of the software defined data center upon completion its execution.

In some embodiments, each firewall configuration management activity is limited to operating on only one entity in order to provide fault tolerance without resorting to distributed transactions. In some embodiments, when an activity needs to update the state of another entity, an activity scheduler starts another activity to update the state of the other entity.

In some embodiments, an activity can request for exclusive execution for the specified entity. In this case, the scheduler of activities would ensure that no other activity is scheduled for execution while the exclusive activity is in progress. In some embodiments, this exclusivity is maintained throughout the execution of the activity, and not just during execution of individual phases. Hence once an exclusive activity starts its execution, it does not interleave with any other activity executed on the same entity. Conceptually this is similar to have exclusive activity hold a distributed lock during entire execution.

Figure 23:
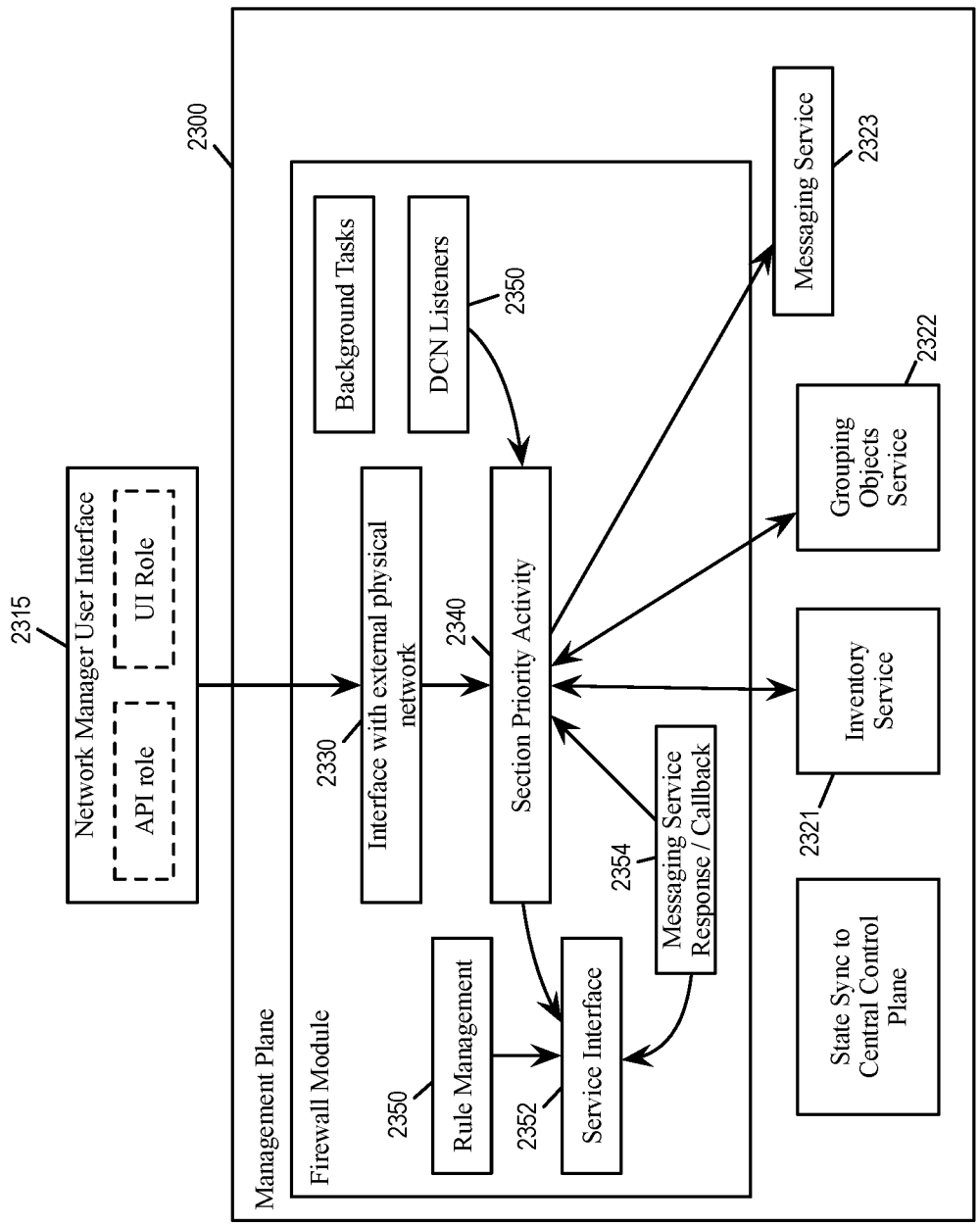
FIG. 23 illustrates a block diagram for a firewall management plane.

FIG. 23 illustrates a block diagram for a firewall management plane. The diagram shows the various components operating in a network manager in support of firewall configuration by using activities. The figure illustrates a management plane 2300 of a network manager (e.g., 105) the includes a firewall module 2310 in communication with various services provided at the network manager such as inventor service 2321, grouping objects service 2322, and messaging service 2323. The network manager also includes a network manager user interface 2315 that is either in the role of API or UI for interface with tenants or the administrator of the datacenter.

The firewall module 2310 includes an interface with external physical network, a section priority activity module 2340, a DCN (data compute node) listening module 2350. The firewall module 2310 includes an interface 2330 with external network, which is able to receive data from the network manager user interface 2315.

The section priority activity module 2340 controls the activities related to firewall configurations, such as assigning priorities to sections upon insertion or deletion of sections. The section priority activity module 2340 also receives data from the interface 2330, through which the section priority activity module receives user specification for firewall rule or firewall configuration section updates.

The firewall module 2310 includes a service interface 2352 that is in communication with the section priority activity module 2340. The service interface 2352 also receives data from a messaging service module 2354 for response and call back. The service interface 2352 is also receiving data from a rule management module 2350, which is responsible for managing the update of rules in the firewall configuration.

Figure 24:
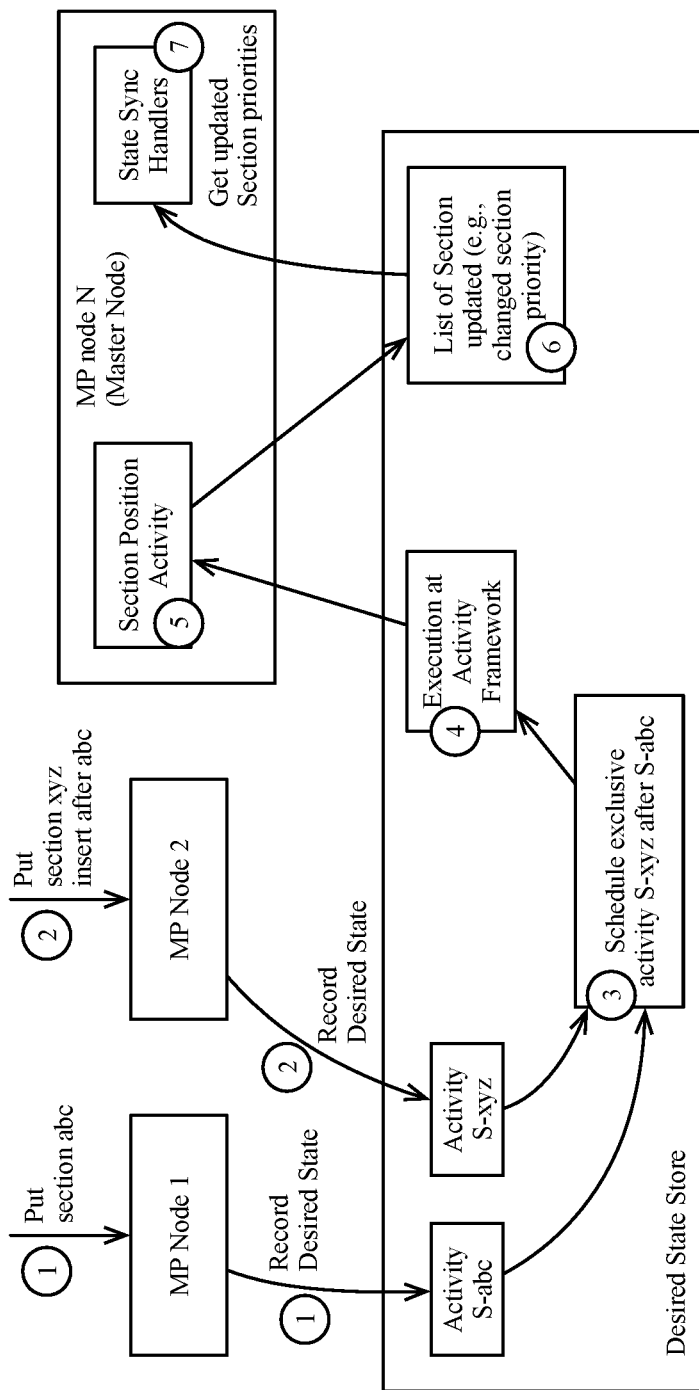
FIG. 24 illustrates an example of using activities in firewall management plane.

FIG. 24 illustrates an example of using activities in firewall management plane. Some embodiments use activities to serialize concurrent operations issued by API users (tenants) into a serial order. The example shows seven operations labeled '1' through '7'. Among these, operations '1', '2', and '3' are for queuing activities initiated from API. Operations '5' and '6' are for activity execution (in the activity framework), which includes assigning priority to a section, as well as persisting (making permanent or storing) the firewall configuration and the list of sections. Operations '7' is for responding to activity execution with follow on logic to publish the firewall configuration to controllers.

Some embodiments includes the following types of activities: (1) Layer2 Section Position Activities that are responsible for globally ordering Layer 2 Firewall Sections, and (2) Layer3 Section Position Activities that are responsible for globally ordering Layer 3 Firewall Sections.

In some embodiments, the API allows concurrent section priority modification operations issued by users/tenants (e.g., multiple tenants wanting to insert or delete sections). The MP (management plane) in some embodiments enforces eventually global order based on the order of user operations of changing priorities. To enforce global ordering of sections in the face of concurrent updates in a distributed system, the MP in some embodiments schedules section-positioning activities on the list of sections (e.g., 950) by using the activity framework.

FIG. 24 illustrates the life of activities "S-abc" and "S-xyz" due to a user action via API. The activities S-abc and S-xyz are initially queued. A queued activity is not executed immediately but stays in a background thread of the activity worker thread pool (2115). Since there may be other section positioning activities already running in the system, some embodiments wait for all these prior activities to be executed first before the queued activities (S-abc and S-xyz) gets executed. Such an activities have other activities as dependencies in the system so that they are executed in the correct order.

In some embodiments, a firewall management process/activity is specified to change a single entity (i.e., one section) in the list of sections in a serial and exclusive mode in the order of user operations on section priorities. All changes to this single section in the list of sections may result in one more section entity changes to be synced to the central controller. To limit number of entities (e.g., sections) changed, some embodiments use sparse positioning. To track the changed entities, some embodiments use an internal section priority change recorder in the list of sections, which is a representation of section positions that were affected by last modification.

The execution of firewall management activities in some embodiments has the following characteristics: (1) operating on a single list of sections that is applicable to all tenants; (2) persisting (making permanent or storing) the list of sections after modification and priority assignment to a section; (3) scheduling exclusive execution on list of sections (only one activity can operate on the list of sections at one time); (4) queuing up new activity strictly after current activities operating on the list of sections; (5) having one phase to modify the list of sections; (6) being fault tolerant by restarting based on saved check point in event of management plane failure; (7) avoiding performing operations that can fail; (8) being idempotent, i.e., the outcome of an activity remain the same regardless how many times it is applied, such as modification of list of sections and persisting of list of sections.

Figure 25:
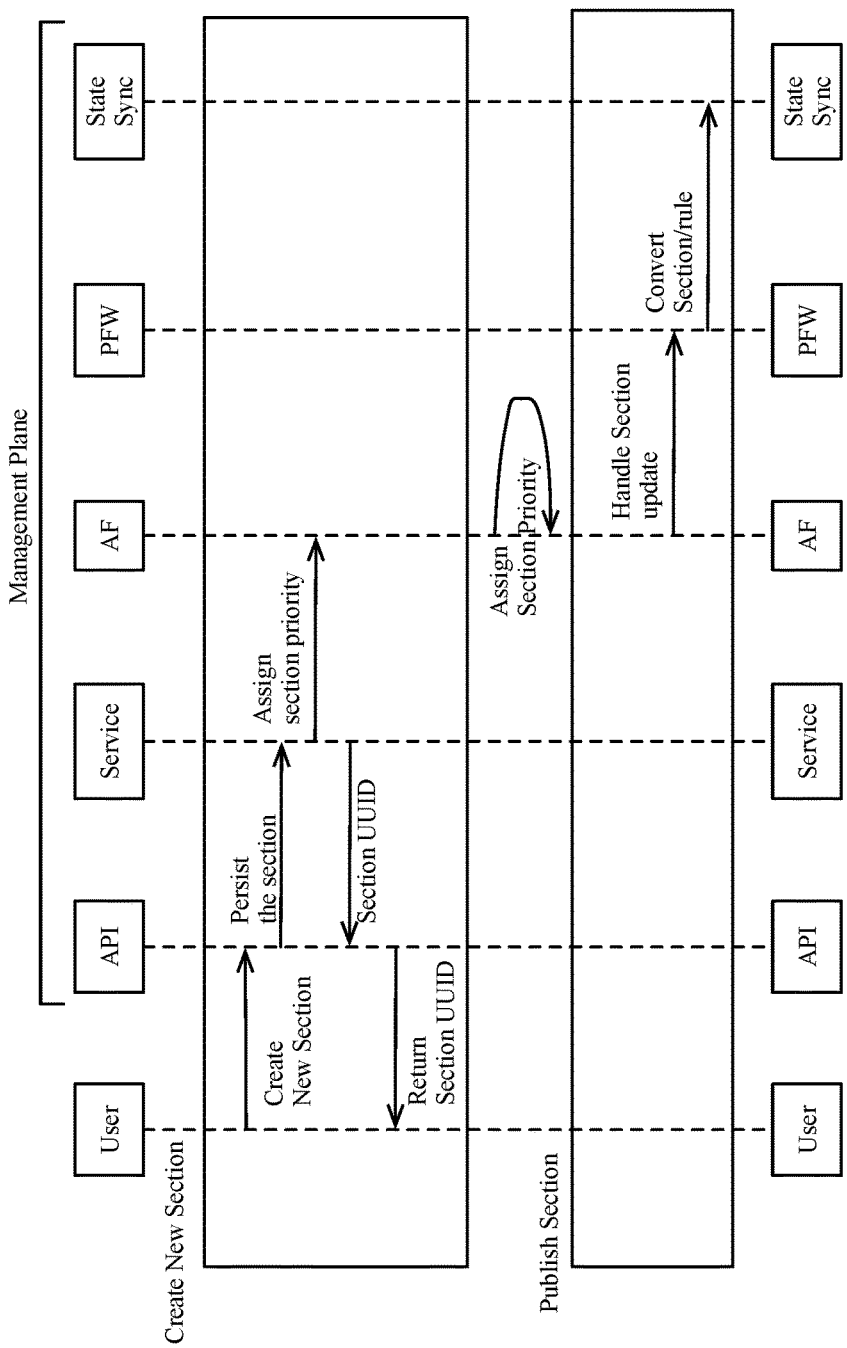
FIG. 25 illustrates an activity for creating a section from its launched by the user through API through its completion and synchronization with the central controller.

Once an activity is completed, the entity modified by the activity is examined for the list of position changes and those changes are synced to the central controller for further downstream processing. Also upon the completion of an activity, the firewall management plane uses several state sync handlers to publish proto buffers to be synced to central controller. One of these sync handlers is a section list delta sync handler, which responds to changes of position in the list of sections, identifies the sections that changed positions (due to API/UI operations) and send one or more sections to the central controller. FIG. 25 illustrates an activity for creating a section from its launched by the user through API through its completion and synchronization with the central controller. (The AF in the figure refers to an activity framework).

IV. Computing Device & Virtualization Software

Figure 26:
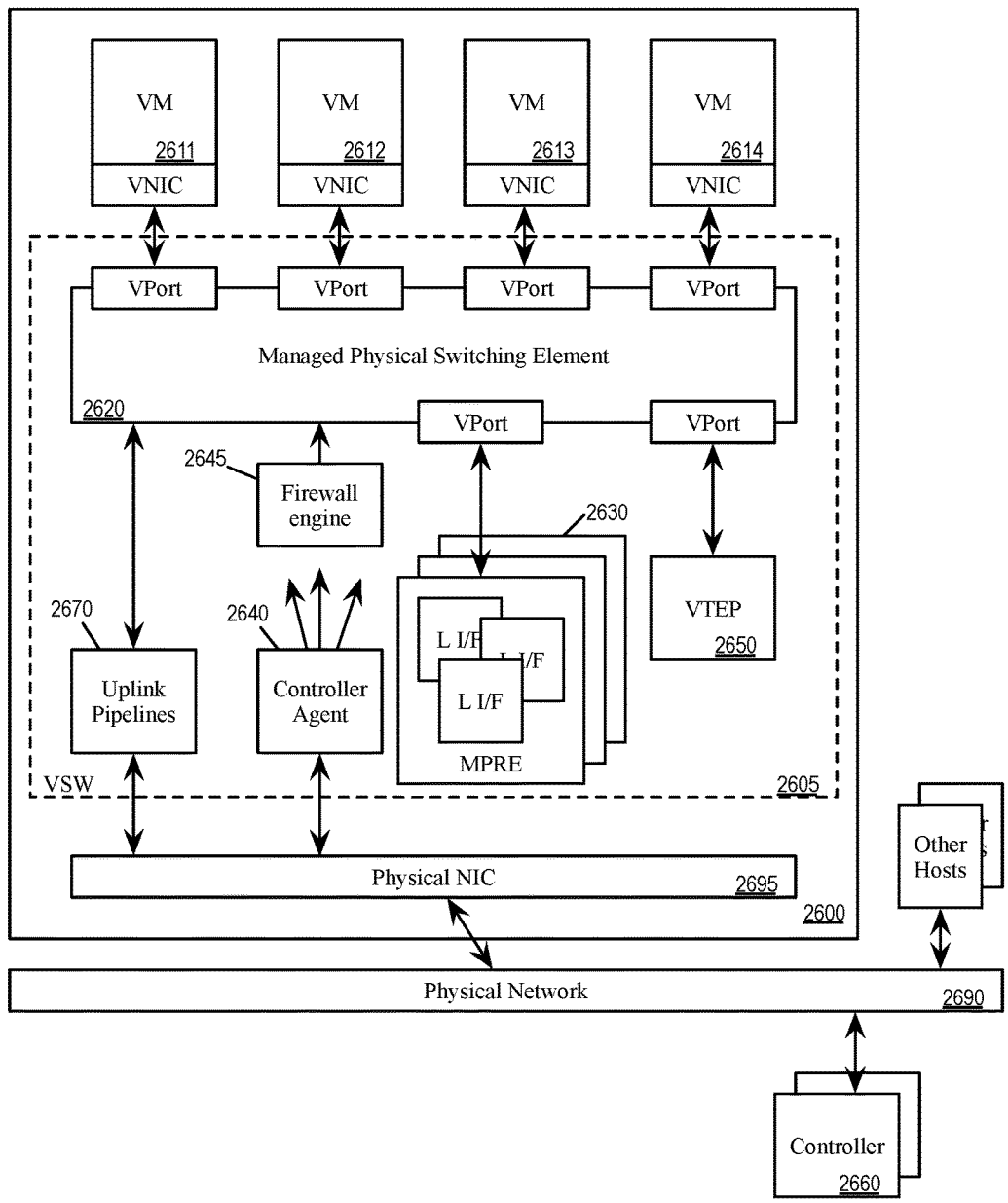
FIG. 26 illustrates a computing device that serves as a host machine that runs virtualization software for some embodiments of the invention.

Virtualization software allows a computing device to host a set of virtual machines (VMs) as well as to perform packet-forwarding operations (including L2 switching and L3 routing operations). These computing devices are therefore also referred to as host machines. The packet forwarding operations of the virtualization software are managed and controlled by a set of central controllers, and therefore the virtualization software is also referred to as a managed software forwarding element (MSFE) in some embodiments. In some embodiments, the MSFE perform its packet forwarding operations for one or more logical forwarding elements as the virtualization software of the host machine operates local instantiations of the logical forwarding elements as physical forwarding elements. Some of these physical forwarding elements are managed physical routing elements (MPREs) for performing L3 routing operations for a logical routing element (LRE), some of these physical forwarding elements are managed physical switching elements (MPSEs) for performing L2 switching operations for a logical switching element (LSE). FIG. 26 illustrates a computing device 2600 that serves as a host machine that runs virtualization software for some embodiments of the invention.

As illustrated, the computing device 2600 has access to a physical network 2690 through a physical NIC (PNIC) 2695. The host machine 2600 also runs the virtualization software 2605 and hosts VMs 2611-2614. The virtualization software 2605 serves as the interface between the hosted VMs and the physical NIC 2695 (as well as other physical resources, such as processors and memory). Each of the VMs includes a virtual NIC (VNIC) for accessing the network through the virtualization software 2605. Each VNIC in a VM is responsible for exchanging packets between the VM and the virtualization software 2605. In some embodiments, the VNICs are software abstractions of physical NICs implemented by virtual NIC emulators.

The virtualization software 2605 manages the operations of the VMs 2611-2614, and includes several components for managing the access of the VMs to the physical network (by implementing the logical networks to which the VMs connect, in some embodiments). As illustrated, the virtualization software includes several components, including a MPSE 2620, a set of MPREs 2630, a controller agent 2640, a firewall engine 2645, a firewall engine, a VTEP 2650, and a set of uplink pipelines 2670.

The VTEP (VXLAN tunnel endpoint) 2650 allows the host machine 2600 to serve as a tunnel endpoint for logical network traffic (e.g., VXLAN traffic). VXLAN is an overlay network encapsulation protocol. An overlay network created by VXLAN encapsulation is sometimes referred to as a VXLAN network, or simply VXLAN. When a VM on the host 2600 sends a data packet (e.g., an ethernet frame) to another VM in the same VXLAN network but on a different host, the VTEP will encapsulate the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The VTEP at the destination host decapsulates the packet and forwards only the original inner data packet to the destination VM. In some embodiments, the VTEP module serves only as a controller interface for VXLAN encapsulation, while the encapsulation and decapsulation of VXLAN packets is accomplished at the uplink module 2670.

The controller agent 2640 receives control plane messages from a controller or a cluster of controllers (e.g., CCP). In some embodiments, these control plane message includes configuration data for configuring the various components of the virtualization software (such as the MPSE 2620 and the MPREs 2630). In some embodiments, the control agent is implementing a local control plane (LCP), and the control plane messages include update fragments for a firewall rules table that is maintained at the firewall engine 2645. In the example illustrated in FIG. 26, the controller agent 2640 receives control plane messages from the controller cluster 2660 from the physical network 2690 and in turn provides the received configuration data to the MPREs 2630 through a control channel without going through the MPSE 2620. However, in some embodiments, the controller agent 2640 receives control plane messages from a direct data conduit (not illustrated) independent of the physical network 2690. In some other embodiments, the controller agent receives control plane messages from the MPSE 2620 and forwards configuration data to the router 2630 through the MPSE 2620.

The firewall engine 2645 in some embodiments stores firewall configuration data that are specified by tenants and administrators and published by the network manager to the host machine. In some embodiments, these firewall configuration data arrives as update fragments and are assembled into a firewall rules table. The firewall engine 2645 uses the received firewall configuration data stored to perform packet-filtering operations. In some embodiments, the received firewall configuration data includes priorities of the firewall rules as well the firewall configuration sections so the firewall engine 2645 knows the order by which the rules are to be examined for matching rules.

The MPSE 2620 delivers network data to and from the physical NIC 2695, which interfaces the physical network 2690. The MPSE also includes a number of virtual ports (vPorts) that communicatively interconnects the physical NIC with the VMs 2611-2614, the MPREs 2630 and the controller agent 2640. Each virtual port is associated with a unique L2 MAC address, in some embodiments. The MPSE performs L2 link layer packet forwarding between any two network elements that are connected to its virtual ports. The MPSE also performs L2 link layer packet forwarding between any network element connected to any one of its virtual ports and a reachable L2 network element on the physical network 2690 (e.g., another VM running on another host). In some embodiments, a MPSE is a local instantiation of a logical switching element (LSE) that operates across the different host machines and can perform L2 packet switching between VMs on a same host machine or on different host machines. In some embodiments, the MPSE performs the switching function of several LSEs according to the configuration of those logical switches.

The MPREs 2630 perform L3 routing on data packets received from a virtual port on the MPSE 2620. In some embodiments, this routing operation entails resolving L3 IP address to a next-hop L2 MAC address and a next-hop VNI (i.e., the VNI of the next-hop's L2 segment). Each routed data packet is then sent back to the MPSE 2620 to be forwarded to its destination according to the resolved L2 MAC address. This destination can be another VM connected to a virtual port on the MPSE 2620, or a reachable L2 network element on the physical network 2690 (e.g., another VM running on another host, a physical non-virtualized machine, etc.).

As mentioned, in some embodiments, a MPRE is a local instantiation of a logical routing element (LRE) that operates across the different host machines and can perform L3 packet forwarding between VMs on a same host machine or on different host machines. In some embodiments, a host machine may have multiple MPREs connected to a single MPSE, where each MPRE in the host machine implements a different LRE. MPREs and MPSEs are referred to as "physical" routing/switching element in order to distinguish from "logical" routing/switching elements, even though MPREs and MPSE are implemented in software in some embodiments. In some embodiments, a MPRE is referred to as a "software router" and a MPSE is referred to a "software switch". In some embodiments, LREs and LSEs are collectively referred to as logical forwarding elements (LFEs), while MPREs and MPSEs are collectively referred to as managed physical forwarding elements (MPFEs). Some of the logical resources (LRs) mentioned throughout this document are LREs or LSEs that have corresponding local MPREs or local MPSE running in each host machine.

In some embodiments, the MPRE 2630 includes one or more logical interfaces (LIFs) that each serves as an interface to a particular segment (L2 segment or VXLAN) of the network. In some embodiments, each LIF is addressable by its own IP address and serve as a default gateway or ARP proxy for network nodes (e.g., VMs) of its particular segment of the network. In some embodiments, all of the MPREs in the different host machines are addressable by a same "virtual" MAC address (or vMAC), while each MPRE is also assigned a "physical" MAC address (or pMAC) in order indicate in which host machine does the MPRE operate.

The uplink module 2670 relays data between the MPSE 2620 and the physical NIC 2695. The uplink module 2670 includes an egress chain and an ingress chain that each performs a number of operations. Some of these operations are pre-processing and/or post-processing operations for the MPRE 2630. The operations of LIFs, uplink module, MPSE, and MPRE are described in U.S. patent application Ser. No. 14/137,862 filed on Dec. 20, 2013, titled "Logical Router", published as U.S. Patent Application Publication 2015/0106804.

As illustrated by FIG. 26, the virtualization software 2605 has multiple MPREs for multiple different LREs. In a multi-tenancy environment, a host machine can operate virtual machines from multiple different users or tenants (i.e., connected to different logical networks). In some embodiments, each user or tenant has a corresponding MPRE instantiation of its LRE in the host for handling its L3 routing. In some embodiments, though the different MPREs belong to different tenants, they all share a same vPort on the MPSE 2620, and hence a same L2 MAC address (vMAC or pMAC). In some other embodiments, each different MPRE belonging to a different tenant has its own port to the MPSE.

The MPSE 2620 and the MPRE 2630 make it possible for data packets to be forwarded amongst VMs 2611-2614 without being sent through the external physical network 2690 (so long as the VMs connect to the same logical network, as different tenants' VMs will be isolated from each other). Specifically, the MPSE performs the functions of the local logical switches by using the VNIs of the various L2 segments (i.e., their corresponding L2 logical switches) of the various logical networks. Likewise, the MPREs perform the function of the logical routers by using the VNIs of those various L2 segments. Since each L2 segment/L2 switch has its own a unique VNI, the host machine 2600 (and its virtualization software 2605) is able to direct packets of different logical networks to their correct destinations and effectively segregates traffic of different logical networks from each other.

V. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 27:
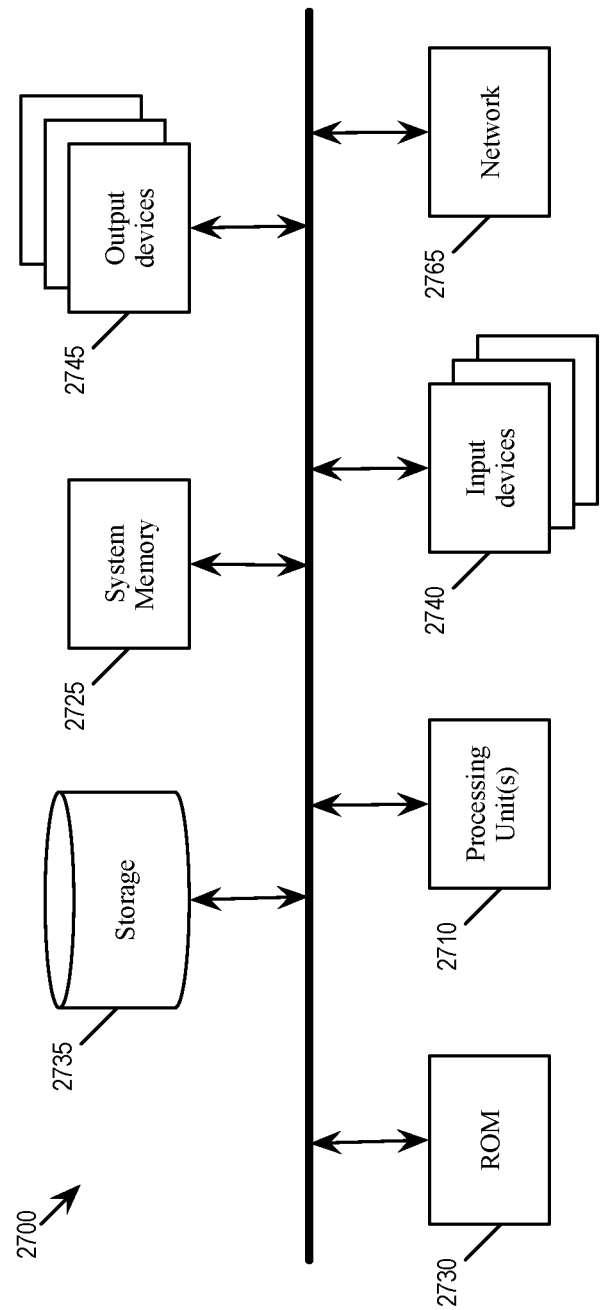
FIG. 27 conceptually illustrates an electronic system with which some embodiments of the invention are implemented.

FIG. 27 conceptually illustrates an electronic system 2700 with which some embodiments of the invention are implemented. The electronic system 2700 can be used to execute any of the control, virtualization, or operating system applications described above. The electronic system 2700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2700 includes a bus 2705, processing unit(s) 2710, a system memory 2725, a read-only memory 2730, a permanent storage device 2735, input devices 2740, and output devices 2745.

The bus 2705 collectively represents all system, peripheral, and chipset buses that communicatively connect the numerous internal devices of the electronic system 2700. For instance, the bus 2705 communicatively connects the processing unit(s) 2710 with the read-only memory 2730, the system memory 2725, and the permanent storage device 2735.

From these various memory units, the processing unit(s) 2710 retrieves instructions to execute and data to process in order to execute the processes of the invention. The processing unit(s) may be a single processor or a multi-core processor in different embodiments.

The read-only-memory (ROM) 2730 stores static data and instructions that are needed by the processing unit(s) 2710 and other modules of the electronic system. The permanent storage device 2735, on the other hand, is a read-and-write memory device. This device is a non-volatile memory unit that stores instructions and data even when the electronic system 2700 is off. Some embodiments of the invention use a mass-storage device (such as a magnetic or optical disk and its corresponding disk drive) as the permanent storage device 2735.

Other embodiments use a removable storage device (such as a floppy disk, flash drive, etc.) as the permanent storage device. Like the permanent storage device 2735, the system memory 2725 is a read-and-write memory device. However, unlike storage device 2735, the system memory is a volatile read-and-write memory, such a random access memory. The system memory stores some of the instructions and data that the processor needs at runtime. In some embodiments, the invention's processes are stored in the system memory 2725, the permanent storage device 2735, and/or the read-only memory 2730. From these various memory units, the processing unit(s) 2710 retrieves instructions to execute and data to process in order to execute the processes of some embodiments.

The bus 2705 also connects to the input and output devices 2740 and 2745. The input devices enable the user to communicate information and select commands to the electronic system. The input devices 2740 include alphanumeric keyboards and pointing devices (also called "cursor control devices"). The output devices 2745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 27, bus 2705 also couples electronic system 2700 to a network 2765 through a network adapter (not shown). In this manner, the computer can be a part of a network of computers (such as a local area network ("LAN"), a wide area network ("WAN"), or an Intranet, or a network of networks, such as the Internet. Any or all components of electronic system 2700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

In this document, the term "packet" refers to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 11, 18, and 19) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for managing firewall configuration of a multi-tenant software defined data center (SDDC) that provides computing and networking resources to a plurality of tenants, the method comprising:

storing a firewall rule configuration comprising a plurality of firewall-rule sections, each firewall-rule section comprising a set of firewall rules, wherein each tenant has a set of machines deployed in the SDDC and a set of one or more firewall-rule sections in the plurality of firewall-rule sections that is not accessible by other tenants;

through a firewall configuration interface comprising a plurality of interfaces, providing each tenant access to the tenant's set of sections through a particular interface associated with the tenant in the plurality of interfaces while preventing access to another tenant's firewall-rule sections through the particular interface associated with the tenant; and concurrently processing access to different sections by different tenants through the different interfaces.

2. The method of claim 1, wherein the plurality of firewall-rule sections are prioritized, wherein applying firewall service to a packet comprises identifying an applicable firewall rule by examining a higher priority firewall-rule section before examining a lower priority firewall-rule section.

3. The method of claim 2, wherein the plurality of firewall-rule sections comprises a highest priority firewall-rule section and a lowest priority firewall-rule section that include rules that are applicable to all tenants of the software defined data center.

4. The method of claim 1 wherein each tenant-specific set of firewall-rule sections comprises rules that are not applicable to other tenants.

5. The method of claim 1, wherein each interface in the plurality of interfaces comprises a user interface element for inserting a firewall-rule section to, and removing a firewall-rule section from, the corresponding set of firewall-rule sections for the tenant.

6. The method of claim 1, wherein each interface in the plurality of interfaces comprises an application programming interface (API) that complies with REST (representational state transfer).

7. The method of claim 1, wherein each interface in the plurality of interfaces comprises a user interface element for inserting a rule to, and removing a rule from, a firewall-rule section belonging to the tenant.

8. The method of claim 5, wherein inserting or removing a new firewall-rule section to the firewall rule configuration comprises changing the priority assignment of a set of firewall-rule sections already in the firewall rule configuration.

9. The method of claim 8, wherein the tenant is a first tenant, wherein when the first tenant inserts or removes a firewall-rule section of the firewall rule configuration a second, different tenant is prevented from inserting or removing a firewall-rule section in the firewall rule configuration while the first tenant is changing the priority assignment of the set of firewall-rule sections already in the firewall rule configuration.

10. A computing device for managing firewall configuration of a multi-tenant software defined data center (SDDC) that provides computing and networking resources to a plurality of tenants, the computing device comprising:
   a set of hardware processing units; and
   a non-transitory computer readable storage medium storing a program for execution by the set of processing units, the program comprising sets of instructions for:
      storing a firewall rule configuration comprising a plurality of firewall-rule sections, each firewall-rule section comprising a set of firewall rules, wherein each tenant has a set of machines deployed in the SDDC and a set of one or more firewall-rule sections in the plurality of firewall-rule sections that is not accessible by other tenants;
      through a firewall configuration interface comprising a plurality of interfaces, providing each tenant access to the tenant's set of sections through a particular interface associated with the tenant in the plurality of interfaces while preventing access to another tenant's firewall-rule sections through the particular interface associated with the tenant; and
      concurrently processing access to different sections by different tenants through the different interfaces.

11. The computing device of claim 10, wherein the plurality of firewall-rule sections are prioritized, wherein applying firewall service to a packet comprises identifying an applicable firewall rule by examining a higher priority firewall-rule section before examining a lower priority firewall-rule section.

12. The computing device of claim 11, wherein the plurality of firewall-rule sections comprises a highest priority firewall-rule section and a lowest priority firewall-rule section that include rules that are applicable to all tenants of the software defined data center.

13. The computing device of claim 10 wherein each tenant-specific set of firewall-rule sections comprises rules that are not applicable to other tenants.

14. The computing device of claim 10, wherein each interface in the plurality of interfaces comprises a user interface element for inserting a firewall-rule section to, and removing a firewall-rule section from, the corresponding set of firewall-rule sections for the tenant.

15. The computing device of claim 10, wherein each interface in the plurality of interfaces comprises an application programming interface (API) that complies with REST (representational state transfer).

16. The computing device of claim 10, wherein each interface in the plurality of interfaces comprises a user interface element for inserting a rule to, and removing a rule from, a firewall-rule section belonging to the tenant.

17. The computing device of claim 14, wherein inserting or removing a new firewall-rule section to the firewall rule configuration comprises changing the priority assignment of a set of firewall-rule sections already in the firewall rule configuration.

18. The computing device of claim 17, wherein the tenant is a first tenant, wherein the set of instructions for allowing the first tenant to insert or to remove a section of the firewall configuration further comprises a set of instructions for preventing a second, different tenant from inserting or removing a section in the firewall configuration while the first tenant is changing the priority assignment of the set of sections already in the firewall configuration.

19. The method of claim 5, wherein inserting or removing a firewall-rule section of a firewall rule configuration comprises sending an instruction to a network manager that updates the firewall rule configuration.

20. The computing device of claim 14, wherein inserting or removing a firewall-rule section of a firewall rule configuration comprises sending an instruction to a network manager that updates the firewall rule configuration.

21. The method of claim 1, wherein rules defined for a first tenant in a firewall-rule section of the first tenant cannot supersede rules for a second tenant defined in a firewall-rule section of the second tenant because rules of the first tenant cannot apply to packets of the second tenant.

* * * * *